(12) United States Patent
Barrett, Jr. et al.

(10) Patent No.: US 7,305,511 B2
(45) Date of Patent: Dec. 4, 2007

(54) PROVIDING BOTH WIRELINE AND WIRELESS CONNECTIONS TO A WIRELINE INTERFACE

(75) Inventors: Richard M. Barrett, Jr., Temecula, CA (US); John C. Tou, Rancho Palos Verdes, CA (US); Wai Lim Ngai, San Diego, CA (US); Sarath Babu Govindarajulu, San Diego, CA (US); Dennis A. Burman, Escondido, CA (US); David J. Bartek, Frisco, TX (US)

(73) Assignee: Microtune (Texas), L.P., Plano, TX (US)

( * ) Notice: Subject to any disclaimer, the term of this patent is extended or adjusted under 35 U.S.C. 154(b) by 443 days.

(21) Appl. No.: 10/689,295

(22) Filed: Oct. 20, 2003

(65) Prior Publication Data

US 2005/0027910 A1 Feb. 3, 2005

Related U.S. Application Data

(63) Continuation-in-part of application No. 10/329,101, filed on Dec. 23, 2002, now Pat. No. 7,136,904.

(51) Int. Cl.
*G06F 13/00* (2006.01)
*G06F 13/20* (2006.01)

(52) U.S. Cl. .................. 710/316; 710/106; 710/116; 370/365; 455/3.01

(58) Field of Classification Search ........... 710/316, 710/1; 370/401, 502, 235, 338, 352, 328, 370/458, 346, 394, 400, 443; 713/201; 709/237, 709/227, 245, 217, 229, 249; 455/62, 557, 455/420, 423, 509; 345/168; 358/434; 700/83
See application file for complete search history.

(56) References Cited

U.S. PATENT DOCUMENTS 5,841,424 A * 11/1998 Kikinis ..................... 345/168
5,887,142 A * 3/1999 Omori et al. ............. 709/237
6,137,802 A * 10/2000 Jones et al. ............... 370/401

(Continued)

FOREIGN PATENT DOCUMENTS

| EP | 0 554 878 A2 | 2/1993 |
|---|---|---|
| EP | 1 039 695 A1 | 3/2000 |
| GB | 2 355 375 A | 4/2001 |
| WO | WO 01/16686 A1 | 3/2001 |
| WO | WO 02/30059 A2 | 4/2002 |

OTHER PUBLICATIONS

PCT Search Report for PCT/US2004/033994, 16 pages, Feb 4, 2005.

(Continued)

*Primary Examiner*—Christopher E. Lee
(74) *Attorney, Agent, or Firm*—Baker Botts L.L.P.

(57) ABSTRACT

In one embodiment, a system for providing both wireline and wireless connections to a wireline interface includes a first wireline interface, a second wireline interface, a wireless interface, and a switch coupled to the first wireline interface, the second wireline interface, and the wireless interface. The switch can selectively couple the first wireline interface to the second wireline interface to allow communication between the first and second wireline interfaces. The switch can further selectively couple the first wireline interface to the wireless interface to allow communication between the first wireline interface and the wireless interface.

33 Claims, 11 Drawing Sheets

U.S. PATENT DOCUMENTS

| | | | |
|---|---|---|---|
| 6,363,085 B1* | 3/2002 | Samuels | 370/502 |
| 6,433,893 B1* | 8/2002 | Murayama | 358/434 |
| 6,546,425 B1* | 4/2003 | Hanson et al. | 709/227 |
| 6,600,734 B1* | 7/2003 | Gernert et al. | 370/352 |
| 6,683,886 B1* | 1/2004 | van der Tuijn et al. | 370/458 |
| 7,136,904 B2* | 11/2006 | Bartek et al. | 709/217 |
| 7,154,877 B2* | 12/2006 | Le et al. | 370/346 |
| 2002/0072391 A1* | 6/2002 | Itoh et al. | 455/557 |
| 2002/0083206 A1* | 6/2002 | Volpano | 709/249 |
| 2002/0159419 A1 | 10/2002 | Morris | 370/338 |
| 2003/0043771 A1 | 3/2003 | Mizutani et al. | 370/338 |
| 2003/0064718 A1* | 4/2003 | Haines et al. | 455/423 |
| 2003/0083013 A1 | 5/2003 | Mowery et al. | 455/41 |
| 2003/0100963 A1* | 5/2003 | Potts et al. | 700/83 |
| 2003/0125019 A1* | 7/2003 | Bajikar | 455/420 |
| 2003/0142631 A1* | 7/2003 | Silvester | 370/252 |
| 2003/0142683 A1* | 7/2003 | Lam et al. | 370/401 |
| 2003/0210700 A1* | 11/2003 | Chen | 370/401 |
| 2003/0217179 A1* | 11/2003 | Famolari et al. | 709/245 |
| 2004/0009751 A1* | 1/2004 | Michaelis et al. | 455/62 |
| 2004/0025051 A1* | 2/2004 | Adrangi et al. | 713/201 |
| 2004/0085944 A1* | 5/2004 | Boehm | 370/338 |
| 2004/0090916 A1* | 5/2004 | Hosein | 370/235 |
| 2004/0122985 A1* | 6/2004 | Parra et al. | 710/1 |
| 2004/0137925 A1* | 7/2004 | Lowe et al. | 455/509 |
| 2004/0160957 A1* | 8/2004 | Coffman | 370/394 |
| 2004/0170181 A1* | 9/2004 | Bogdon et al. | 370/400 |
| 2004/0235519 A1* | 11/2004 | Frielink et al. | 455/557 |
| 2004/0236856 A1* | 11/2004 | Keohane et al. | 709/229 |
| 2006/0098593 A1* | 5/2006 | Edvardsen et al. | 370/328 |
| 2006/0098620 A1* | 5/2006 | Zhou et al. | 370/352 |

OTHER PUBLICATIONS

International Search Report for PCT/US2004/033574, 10 pages, May 19, 2005.

Haartsen, "Bluetooth—The universal radio interface for *ad hoc*, wireless connectivity," Ericsson Review No. 3, pp. 110-117, 1998.

"Chapter 4 Architectural Overview," Universal Serial Bus Specification Revision 2.0, pp. 15-24, Apr. 2000.

"Part H:2, HCI USB Transport Layer, An addendum to the HCI document," Bluetooth Specification Version 1.1, pp. 782-796 plus cover page, Feb. 22, 2001.

"Products, Bluetooth Products," CC&C Technologies Inc., 1 page, date unknown.

"Bluetooth™ USB, Thanks to COM One Bluetooth™ USB, connect seamlessly and effortlessly, PCs, to share information," COM One—The Telecom Expert, 2 pages, date unknown.

"Products, AnyCOM Bluetooth Products," ANYCOM, 1 page, date unknown.

"Anycom Bluetooth™ USB Adapter USB-100," ANYCOM, 2 pages, date unknown.

"Products, the TDK Systems Bluetooth brand," TDK Systems, 2 pages, date unknown.

"B091H1, Bluetooth Dongle, Wireless Home Network," Bluetooth™ CEF, 1 page, date unknown.

"USB Bluetooth™ Adaptor," www.brainboxes.com, 1 page, date unknown.

"Data Sheet, 3Com Wireless Bluetooth™ PC Card, USB Adapter, and Printer Adapter," 3COM, 4 pages, date unknown.

Morse, "D-Link News Release—D-Link enters Bluetooth connectivity with USB wireless adapter for Apple Macintosh," d-Link U.S.A., pp. 1-3, date unknown.

D-Link Installation Guide, D-Link DWB-120M Bluetooth™ USB Adapter, D-Link, 2 pages, date unknown.

"Bluetooth Wireless Home-Networking Systems User's Manual," pp. 1-26, date unknown.

* cited by examiner

| | IDENTIFIER (32a) | LINK KEY (32b) | PIN CODE (32c) | POWER LEVEL (32d) | ACCESS CODE (32e) |
|---|---|---|---|---|---|
| 34a | 0110010 | 110101 | 011111 | 0101 | 111100 |
| 34b | 0101000 | 011101 | 010101 | 0001 | 100111 |
| 34c | 1110010 | 101100 | 110011 | 0011 | 001111 |

36a, 36b

30

PROVIDING BOTH WIRELINE AND WIRELESS CONNECTIONS TO A WIRELINE INTERFACE

RELATED APPLICATION

This application is a continuation-in-part of U.S. application Ser. No. 10/329,101, filed Dec. 23, 2002 now U.S. Pat. No. 7,136,904, by David J. Bartek et al., entitled "Wireless Cable Replacement for Computer Peripherals Using a Master Adapter."

TECHNICAL FIELD OF THE INVENTION

This invention relates in general to wireless communication and in particular to providing both wireline and wireless connections to a wireline interface.

BACKGROUND OF THE INVENTION

Universal Serial Bus (USB) connections provide a flexible and adaptable method for connecting peripheral devices to computers. The ability of USB devices to "plug and play" as well as the wide array of USB devices available make USB devices a common staple of computing accessories. As USB devices become more and more common, technologies that provide increased USB functionality become increasingly valuable.

SUMMARY OF THE INVENTION

Particular embodiments of the present invention may reduce or eliminate disadvantages and problems associated with connections to peripheral devices.

In one embodiment of the present invention, a system for providing both wireline and wireless connections to a wireline interface includes a first wireline interface, a second wireline interface, a wireless interface, and a switch coupled to the first wireline interface, the second wireline interface, and the wireless interface. The switch can selectively couple the first wireline interface to the second wireline interface to allow communication between the first and second wireline interfaces. The switch can further selectively couple the first wireline interface to the wireless interface to allow communication between the first wireline interface and the wireless interface.

Particular embodiments of the present invention may provide one or more technical advantages. Particular embodiments provide a wireless substitute for physical connections to peripherals. This allows greater mobility for both the computers and the peripherals without depriving the computer of peripheral functions or requiring that the peripherals be moved around with the computer. In the case of peripherals that are difficult to move, a wireless connection allows a computer to access the immobile peripheral from a variety of locations. For example, a cable modem may need to be placed next to an incoming cable wire, while a printer might be placed near a paper supply. A wireless connection allows a computer to be moved around within the range of the wireless connection without losing access to peripherals or requiring that the peripherals be moved along with the computer. This is particularly useful in the case of computers that are relatively easy to move, such as laptops, used in conjunction with devices that require power, cable or telephone outlets in fixed locations.

Particular embodiments enable peripheral sharing. Rather than monopolizing a single physical port, several wireless connections may share access to a single peripheral through wireless connections. This allows peripheral to be used by multiple computers in a wireless neighborhood. Similarly, a single physical port on a computer may be connected to a wireless hub that supports multiple wireless peripheral connections. This allows the computer to access multiple peripherals using a single port.

Particular embodiments may provide both wireline and wireless connections to a peripheral. These embodiments may allow one computer to be coupled to a peripheral via a wireline connection and one or more other computers to be coupled to the peripheral via wireless connections. This may, in particular embodiments, allow a user to add wireless connectivity to a system that uses wireline connections without the cost of replacing those existing wireline connections. In particular embodiments, after the wireless connectivity has been added, the wireline connections may be used the same as before.

In particular embodiments, one or more wireless connections that enable one or more computers to communicate with one or more peripherals may be automatically established. In particular embodiments, a wireless connection between a computer and a peripheral may be readily added to or removed from a wireless community that includes one or more wireless connections between one or more computers and one or more peripherals.

Certain embodiments may provide all, some, or none of these technical advantages. Certain embodiments may provide one or more other technical advantages, one or more of which may be readily apparent to those skilled in the art from the figures, descriptions, and claims herein.

BRIEF DESCRIPTION OF THE DRAWINGS

To provide a more complete understanding of the present invention and the features and advantages thereof, reference is made to the following description, taken in conjunction with the accompanying drawings, in which.

DETAILED DESCRIPTION OF THE INVENTION

Figure 1:
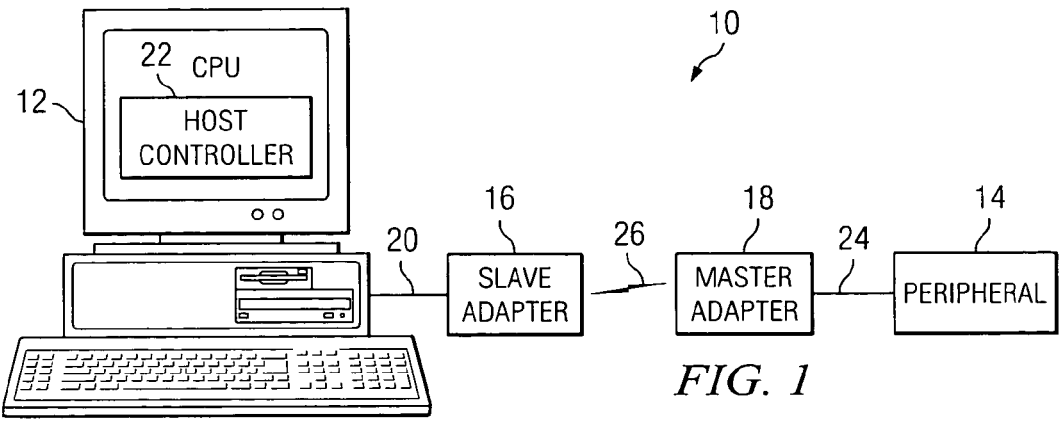
FIG. 1 illustrates a system allowing wireless communication between a computer and a peripheral according to a particular embodiment of the invention.

FIG. 1 illustrates a particular embodiment of a system 10 that wirelessly couples a computer 12 to a peripheral 14. System 10 includes a slave adapter 16 coupled to computer 12 and master adapter 18 coupled to peripheral 14. In general, system 10 permits computer 12 to exchange information with peripheral 14 as if peripheral 14 were coupled to computer 12 using a wireline connection. System 10 thus provides a virtual connection that stands in place of a physical connection, such as a cable, allowing computers 12 to use existing physical ports to effective couple to peripherals 14 using a virtual cable.

Although a particular embodiment of system 10 is depicted with a wireless connection replacing a physical connection between computer 12 and peripheral 14, the techniques of various embodiments of the present invention are adaptable to a wide variety of virtual connections in place of physical connections. The respective physical connections to computer 12 and peripheral 14 can include any suitable form of communication, including Internet protocol (IP), Ethernet, asynchronous transfer mode (ATM), and synchronous optical network (SONET), and/or serial protocols, such as RS232, IEEE 1394, or Universal Serial Bus (USB) 1.1 or 2.0. Computer 12 and peripheral 14 may use different communication protocols, so that virtual connection replaces both the physical connection and any intervening protocol converters. The virtual connection itself may include any number and type of intervening protocols, whether wireline or wireless, examples of which include IP, ATM, SONET, serial protocols, Ethernet, radio frequency coaxial cable, RS 232, Firewire, General Packet Radio Service (GPRS), 802.11 WiFi, satellite links, or any other communication protocol in any suitable medium. In general, virtual connection may include any number or combination of wireless and/or wireline segments. Physical and virtual connections may carry information in any suitable form, including packets, cells, frames, segments, fragments, or other portions of data (all of which are described with the general term "packets"). Because the described techniques are adaptable to a wide variety of physical and virtual connections, the description of particular embodiments that replace a physical connection with a wireless connection are illustrative examples rather than exclusive ones.

Computer 12 represents any collection of hardware or software components for processing and exchanging information, running applications, generating output, performing calculations, or any other suitable computing task. Examples of computers 12 include personal computers (PCs), laptops, and servers. Computer 12 includes any necessary or suitable microprocessing components, such as microprocessors, micro-controllers, or digital signal processors (DSPs), and memory components, such as optical storage, magnetic storage, or removable media, whether volatile or non-volatile. Computer 12 also includes inputs and outputs allowing computer 12 to exchange information with users.

In order to communicate with peripheral 14, computer 12 exchanges information according to a communications protocol using physical connection 20. Physical connection 20 represents any suitable physical medium for communicating information including insulated wires, shielded twisted pairs, coaxial cable, optical fiber, or any other physical connection for propagating signals. The communication protocol used to communicate the information may be any suitable protocol for the medium, examples of which include Internet protocol (IP), Ethernet asynchronous transfer mode (ATM), and synchronous optical network (SONET), and/or serial protocols, such as RS232, IEEE 1394, or Universal Serial Bus (USB) 1.1 or 2.0.

In a particular embodiment, connection 20 is a Universal Serial Bus (USB) connection 20 that allows computer 12 to exchange information with peripheral 14 using a USB protocol. Computer 12 manages these USB connections using a host controller 22. Host controller 22 includes hardware and/or software that detects USB devices coupled to computer 12, establishes communication connections with the device, identifies the type of device, and manages information exchange in the communication connections. For example, host controller 22 may regulate the rate of information exchange, identify particular types of information using headers, selectively route information to particular components of computer 12, or perform other similar management tasks.

Peripherals 14 are specialized devices that perform delegated tasks at the direction of computer 12. Examples of peripherals 14 include printers, scanners, digital cameras, modems (such as 56K, cable, DSL), joysticks, webcams, personal digital assistants (PDAs), mice, and keyboards. Peripherals 14 may include any suitable processing capacity, memory, or interfaces for performing their assigned tasks. Peripherals 14 may exchange information using physical connections 24, which represent any suitable medium for propagating signals, including any of the examples listed above for connection 20. In a particular embodiment, peripherals 14 are USB devices that exchange control information using USB protocol. In such an embodiment, peripherals 14 maintain registration information that may be communicated to a USB master device, such as computer 12 in order to establish a USB connection with the master device.

Slave adapter 16 represents a wireless communication device that appears as a peripheral 14 to computer 12 when physically coupled to computer 12. Slave adapter 16 establishes a wireless connection 26 with master adapter 18 that allows slave adapter 16 to exchange information according to any suitable wireless protocol. The term "establish" as used in this specification may refer to accepting a request for a wireless communication or initiating the request; it need not be limited to one or the other. As part of establishing connections, slave adapter 16 may detect wireless devices, negotiate parameters for establishing communications, regulate information flow, negotiate a communication frequency, or perform any other suitable management task. In a particular embodiment, slave adapter 16 exchanges information wirelessly according to the BLUETOOTH wireless protocol, which provides standards for performing the detection and negotiation of wireless connections.

Master adapter 18 represents a wireless communication device that appears as a host controller 22 to peripheral 14. Master adapter 18 has the additional ability to establish and manage communication connections with peripherals 14 using physical connections 114. Consequently, master adapter 18 may receive information from peripherals 14 and communicate that information to other devices using wireless connections 26. Conversely, master adapter 18 may receive information from wireless connection 26 and communicate the information to peripheral 14. In a particular embodiment, master adapter 18 establishes a USB connection with peripheral 14, and communicates with slave adapter 16 using the BLUETOOTH wireless protocol.

In operation, slave adapter 16 becomes operational when it is coupled to computer 12. At this point, slave adapter 16 may optionally register itself with host controller 22 of computer 12 by communicating registration information for itself to computer 12. In such an embodiment, slave adapter 16 may be controlled by driver software installed in computer 12 once it is registered, allowing computer 12 to configure slave adapter 16 for particular packet sizes, protocols, or other operating parameters. Alternatively, slave adapter 16 may remain inactive until a wireless connection 26 is established with master adapter 18. In such an embodiment, slave adapter 16 does not communicate registration information for itself to computer 12. Instead, slave adapter 16 awaits confirmation that master adapter 18 is coupled to a peripheral 14 and passes registration information from peripheral 14 to computer 12.

Master adapter 18 detects when it is coupled to peripheral 14. In response to detecting the connection to peripheral 14, master adapter 18 collects registration information for the peripheral 14 and establishes a communication connection with the peripheral 14. Master adapter 18 appears as a USB host to peripheral 14, and it may therefore control the operation of peripheral 14.

Before, after, or during the establishment of connection to peripheral 14, master adapter 18 seeks out slave adapter 16 within range of master adapter 18 and establishes wireless connection 26 with slave adapter 16. Slave adapter 16 then communicates a request for registration information from computer 12 to master adapter 18 using wireless connection 26. In response, master adapter 18 communicates registration information for peripheral 14 to slave adapter 16. Slave adapter 16 in turn communicates the registration information to computer 12 using physical connection 20. Because computer 12 receives registration information from physical connection 20, computer 12 treats the incoming registration information as if it came from a new peripheral 14 that was just connected to computer 12. Computer 12 thus establishes a virtual communication connection with a peripheral 14, although in reality, slave adapter 16 is the device exchanging information with computer 12. In particular embodiments, master adapter 18 or slave adapter 16 may modify the registration information for peripheral 14 in order to facilitate information exchange over wireless connection 16. For example, master adapter 18 may limit or modify the size of packets communicated by computer 12 in order to utilize wireless connection 26 more efficiently or to utilize USB hardware in slave adapter 16 more effectively.

Slave adapter 16 communicates information received from computer 12 to master adapter 18 by converting the information into a wireless signal. Master adapter 18 in turn receives the information, converts the information to an electrical signal (or other suitable form for physical connection 24), and passes the information to peripheral 14. Since peripheral 14 recognizes master adapter 18 as a USB host, peripheral 14 treats the information received from master adapter 18 as it would treat information received from computer 12 using a wireline connection. Thus, computer 12 effectively controls peripheral 14 in the same manner it would if computer 12 and peripheral 14 were connected using a wireline connection.

Peripheral 14 may also return information to computer 12 by communicating the information to master adapter 18. Because peripheral 14 recognizes master adapter 18 as a master device, the responses returned by peripheral 14 are of the type of responses that would be presented to computer 12 using a wireline connection. Master adapter 18 converts the responses into a wireless signal, which is then communicated to slave adapter 16. Slave adapter 16 extracts the content from the wireless signal and communicates it to computer 12. Computer 12 treats the information as having been received from peripheral 14, and therefore responds as if peripheral 14 were connected to computer 12 using a wireline connection.

The particular types of information exchanged by computer 12 and peripheral 14 may include a number of types of information, such as serial data, voice/audio, video, packets or any other suitable form of information. Information may also be converted in different forms in order to facilitate communication in system 10. One example is a system 10 in which a USB peripheral 14 exchanges information wirelessly with computer 12 over a BLUETOOTH wireless connection. In such a system, master adapter 18 receives digital data from peripheral 14, and stores the information in BLUETOOTH packets that contain header information specifying the type of data stored, its source, and other useful information. The BLUETOOTH packets are communicated as a wireless signal to slave adapter 16, which extracts the original information and communicates the information in USB frames to computer 12. Thus, both computer 12 and peripheral 14 see the connection as a wireline USB connection.

Certain embodiments of slave adapter 16 and master adapter 18 provide secure wireless connections using various techniques. One example of an encryption method is the use of a secure wireless protocol, in which adapters 16 and 18 maintain private and/or public keys used to decode information. 802.11 is one example of a communication protocol that incorporates encryption. Another method of security is to provide exclusive recognition between slave adapter 16 and master adapter 18 so that each device will only establish wireless connections 26 with its counterpart device. For example, slave adapter 16 and master adapter 18 may be programmed with a unique encryption key, and establish connections only with devices that indicate possession of the unique key during an authentication process.

In particular embodiments, slave adapter 16 and master adapter 18 may automatically pair with each other to enable communication between computer 12 and peripheral 14 via wireless connection 26. In particular embodiments, slave adapter 16 and master adapter 18 need not be hard coded to communicate with each other. As a result, in some of these embodiments, slave adapter 16 and master adapter 18 may automatically pair with each other when slave adapter 16, master adapter 18, or both are installed by a user.

In particular embodiments, master adapter 18 may have an inquiry mode for pairing with one or more slave adapters 16 and an operational mode for providing communication between one or more computers 12 and peripheral 14 via one or more wireless connections 26. Master adapter 18 may automatically enter inquiry mode when master adapter 18 powers up. In addition or as an alternative, master adapter 18 may automatically enter inquiry mode in response to the occurrence of an event. As an example and not by way of limitation, master adapter 18 may automatically enter inquiry mode in response to master adapter 18 being uncoupled from peripheral 14. In particular embodiments, when master adapter 18 is in operational mode, master adapter 18 may automatically check whether master adapter 18 is coupled to peripheral 14 at certain intervals. If master adapter 18 determines that master adapter 18 is not coupled to peripheral 14, master adapter 18 may automatically enter inquiry mode. As another example, master adapter 18 may automatically enter inquiry mode in response to a user resetting master adapter 18 or otherwise causing master adapter 18 to enter inquiry mode.

When master adapter 18 enters inquiry mode, master adapter 18 attempts to detect one or more slave adapters 16 and establish one or more wireless connections 26 between slave adapters 16 and master adapter 18. To detect slave adapters 16, master adapter 18 may scan one or more communication channels associated with slave adapters 16. A communication channel may include one or more signal frequencies. In particular embodiments, to scan a particular communication channel, master adapter 18 may broadcast a scan message in the particular communication channel and receive responses from one or more slave adapters 16 receptive to scan messages broadcast in the particular communication channel. A response from a slave adapter 16 may include a BLUETOOTH address or other suitable identifier of slave adapter 16, and, when master adapter 18 receives the response, master adapter 18 may store the identifier. In particular embodiments, master adapter 18 may use identifiers received from slave adapters 16 to communicate connect requests to slave adapters 16, as described below.

If master adapter 18 detects one or more slave adapters 16, master adapter 18 communicates a connect request to each detected slave adapter 16. Master adapter 18 may wait to communicate a connect request to a slave adapter 16 until after master adapter 18 has scanned a particular number of communication channels. As an example, master adapter 18 may wait until master adapter 18 has scanned all available communication channels. A connect request communicated to a slave adapter 16 may include the identifier of slave adapter 16 that master adapter received in response to a scan message. Slave adapter 16 may use the identifier in the connect request to determine whether the connect request is directed to slave adapter 16. As an example and not by way of limitation, if slave adapter 16 receives a connect request, slave adapter 16 may compare the identifier in the connect request with an identifier of slave adapter 16. If the identifier in the connect request does not correspond to an identifier of slave adapter 16, slave adapter 16 may disregard the connect request. If the identifier in the connect request corresponds to an identifier of slave adapter 16, slave adapter 16 may determine whether to acknowledge the connect request, as described below.

The connect request may also include a protocol service multiplexer (PSM) of master adapter 18. Slave adapter 16 may use the PSM in the connect request to determine whether to acknowledge the connect request. As an example and not by way of limitation, slave adapter 16 may compare the PSM in the connect request with a PSM of slave adapter 16. In particular embodiments, if the PSM in the connect request does not correspond to a PSM of slave adapter 16, slave adapter 16 may disregard the connect request. If the PSM in the connect request corresponds to a PSM of slave adapter 16, slave adapter 16 may communicate an acknowledgement to master adapter 18.

A PSM includes any suitable information that slave adapter 16 may use to determine whether to acknowledge the connect request. PSMs may be dynamically configurable. In particular embodiments, PSMs are numbers and particular ranges of PSMs are reserved for particular purposes. Particular ranges of PSMs may be freely available. In particular embodiments, a PSM may be unique to one or more particular equipment manufacturers and, in some of these embodiments, slave adapter 16 may communicate with master adapter 18 only if an equipment manufacturer of slave adapter 16 corresponds to an equipment manufacturer of master adapter 18. To determine whether an equipment manufacturer of slave adapter 16 corresponds to an equipment manufacturer of master adapter 18, slave adapter 16 may compare the PSM in the connect request to a PSM of slave adapter 16. In particular embodiments, a PSM may be unique to one or more particular types of equipment. As an example, slave adapters 16 and master adapters 18 that are capable of providing wireless connections 26 between a computer 12 and a peripheral 14 may have PSMs that correspond to each other. If the PSM in the connect request corresponds to a PSM of slave adapter 16, slave adapter 16 may be capable of providing wireless connection 26 between computer 12 and peripheral 14 and may accordingly communicate an acknowledgement to master adapter 18, as described above. Although particular PSMs are described, the present invention contemplates any suitable PSMs.

Receipt of an acknowledgement from slave adapter 16 may establish wireless connection 26 between slave adapter 16 and master adapter 18. In particular embodiments, the receipt of the acknowledgement establishes wireless connection 26 only if master adapter 18 receives the acknowledgement within a certain time after master adapter 18 communicates a connect request to slave adapter 16. In particular embodiments, after wireless connection 26 between slave adapter 16 and master adapter 18 has been established, slave adapter 16 and master adapter 18 may start to communicate with each other to enable communication between computer 12 and peripheral 14 via wireless connection 26.

In particular embodiments, for security or other purposes, master adapter 18 may require a valid password from slave adapter 16. In some of these embodiments, after wireless connection 26 between slave adapter 16 and master adapter 18 has been established, master adapter 18 may communicate a password request to slave adapter 16 and, in response to the password request, slave adapter 16 may communicate a password to master adapter 18. When master adapter 18 receives the password from slave adapter 16, master adapter 18 may determine whether the password is valid. In particular embodiments, to make this determination, master adapter 18 may compare the received password with one or more passwords stored in a memory unit of master adapter 18. If the received password does not correspond to a stored password, master adapter 18 may communicate a failure message to slave adapter 16. If the received password corresponds to a stored password, master adapter 18 may communicate a success message to slave adapter 16. After master adapter 18 communicates the success message to slave adapter 16, master adapter 18 and slave adapter 16 may start to communicate with each other to enable communication between computer 12 and peripheral 14 via wireless connection 26.

Master adapter 18 may automatically enter operational mode in response to one or more wireless connections 26 between master adapter 18 and one or more slave adapters 16 being established. In addition or as an alternative, master adapter 18 may automatically enter or remain in operational mode in response to master adapter 18 determining that master adapter 18 is coupled to peripheral 14. In particular embodiments, master adapter 18 does not switch from inquiry mode to operational mode until at least one wireless connection 26 between master adapter and at least one slave adapter 16 has been established. In particular embodiments, master adapter 18 does not switch from inquiry mode to operational mode until master adapter 18 has at least attempted to establish a wireless connection 26 between master adapter 18 and each slave adapter 16 that master adapter 18 detected. Master adapter 18 may attempt to establish wireless connection between slave adapter 16 and master adapter 18 one or more times, according to particular needs.

When master adapter 18 switches from inquiry mode to operational mode, master adapter 18 may indicate to a user that master adapter 18 has switched from inquiry mode to operational mode. As an example and not by way of limitation, master adapter 18 may include a light-emitting diode (LED) that master adapter 18 may use to indicate that master adapter 18 has switched from inquiry mode to operational mode. In particular embodiments, if master adapter 18 is coupled to peripheral 14, a user may uncouple master adapter 18 from peripheral 14 to cause master adapter 18 to automatically pair with one or more slave adapters 16. In response to master adapter being uncoupled from peripheral 14, master adapter 18 may enter inquiry mode, detect slave adapters 16, and establish one or more wireless connections 26 between master adapter 18 and slave adapters 16, as described above. Master adapter 18 may then switch from inquiry mode to operational mode and use the LED to indicate to the user that master adapter 18 has switched from inquiry mode to operational mode. The user may then couple master adapter 18 to peripheral 14 to enable computer 12 to communicate with peripheral 14 via wireless connection 26.

Master adapter 18 may collect information regarding one or more slave adapters 16. In particular embodiments, master adapter 18 may collect information regarding a slave adapter 16 when master adapter 18 pairs with slave adapter 16. As an example and not by way of limitation, slave adapter 16 may communicate a BLUETOOTH address or other identifier of slave adapter 16 to master adapter 18 in response to a scan message from master adapter 18, as described above, and master adapter 18 may store the identifier of slave adapter 16. In addition or as an alternative, in particular embodiments, an acknowledgement from slave adapter 16 may include information regarding slave adapter 16 that master adapter 18 may store. Examples of information regarding a slave adapter 16 that master adapter 18 may collect include a BLUETOOTH address or other identifier of slave adapter 16, a link key associated with slave adapter 16, a personal identification number (PIN) code associated with slave adapter 16, a power level associated with slave adapter 16, an access code associated with slave adapter 16, and any other suitable information regarding slave adapter 16. Master adapter 18 may use collected information regarding a slave adapter 16 for any suitable purpose. As an example and not by way of limitation, master adapter 18 may use an identifier of slave adapter 16 to direct communication to slave adapter 16, to identify communication from slave adapter 16, or both.

Figures 2, 4:
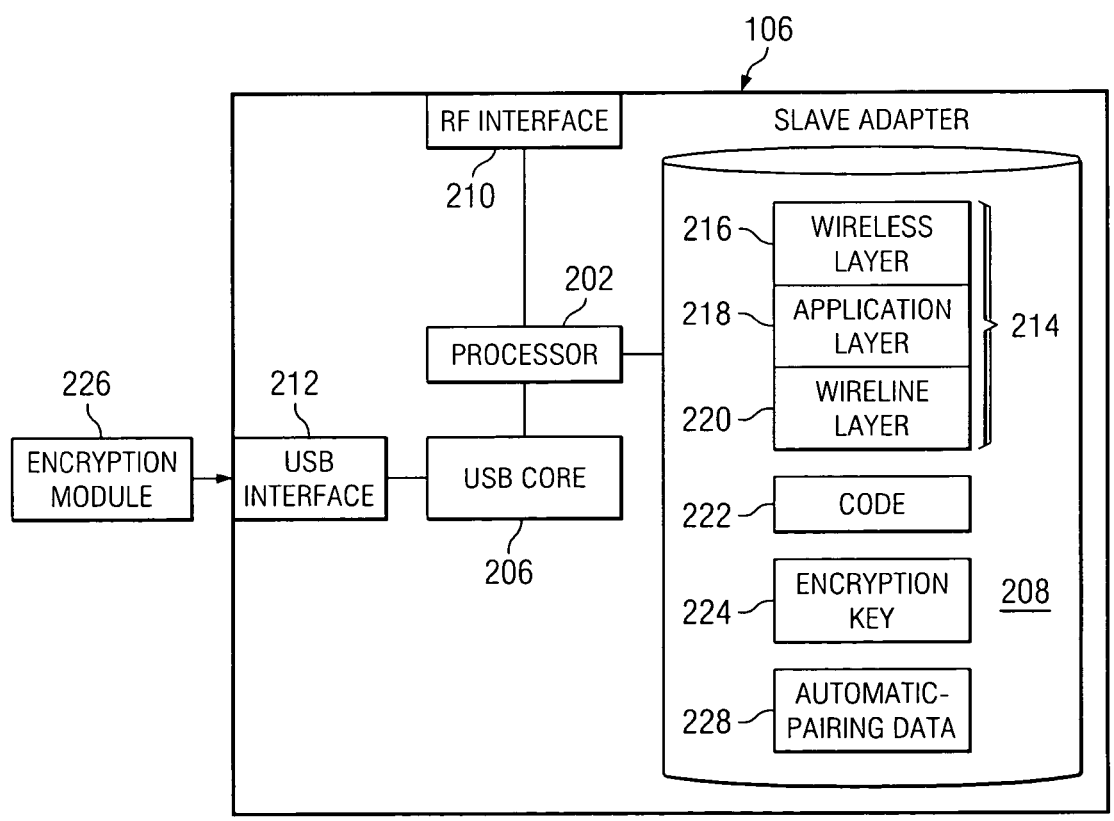
FIG. 2 illustrates an example table of information regarding one or more slave adapters.
FIG. 4 illustrates one embodiment of a slave adapter used in the system of FIGS. 1 or 3.

FIG. 2 illustrates an example table 30 of information regarding one or more slave adapters 16. Table 30 may be stored in a memory unit of master adapter 18. Table 30 includes one or more columns 32 that each correspond to particular information regarding slave adapters 16. As an example and not by way of limitation, column 32a corresponds to BLUETOOTH addresses or other identifiers of slave adapters 16, column 32b corresponds to link keys associated with slave adapters 16, column 32c corresponds to PIN codes associated with slave adapters 16, column 32d corresponds to power levels associated with slave adapters 16, and column 32e corresponds to access codes associated with slave adapters 16. Although table 30 is described and illustrated as including particular columns 32 corresponding to particular types of particular information regarding particular slave adapters 16, table 30 may include any suitable columns 32 corresponding to any suitable types of any suitable information regarding any suitable slave adapters 16. Table 30 also includes one or more rows 34 that each correspond to a particular slave adapter 16. As an example and not by way of limitation, row 34a corresponds to a first slave adapter 16, row 34b corresponds to a second slave adapter 16, and row 34c corresponds to a third slave adapter 16. Cells 36 lie at the intersections of columns 32 and rows 34. A cell 36 contains particular information regarding a particular slave adapter 16. As an example, cell 36a contains information reflecting a BLUETOOTH address or other identifier of first slave adapter 16. Cell 36b similarly contains information reflecting a link key associated with second slave adapter 16. Although particular cells 36 containing particular information regarding particular slave adapters 16 are described and illustrated, the present invention contemplates any suitable cells 36 containing any suitable information regarding any suitable slave adapters 16. Master adapter 18 may use information in table 30 to communicate with slave adapter 16 when master adapter 18 enters operational mode.

Figure 3:
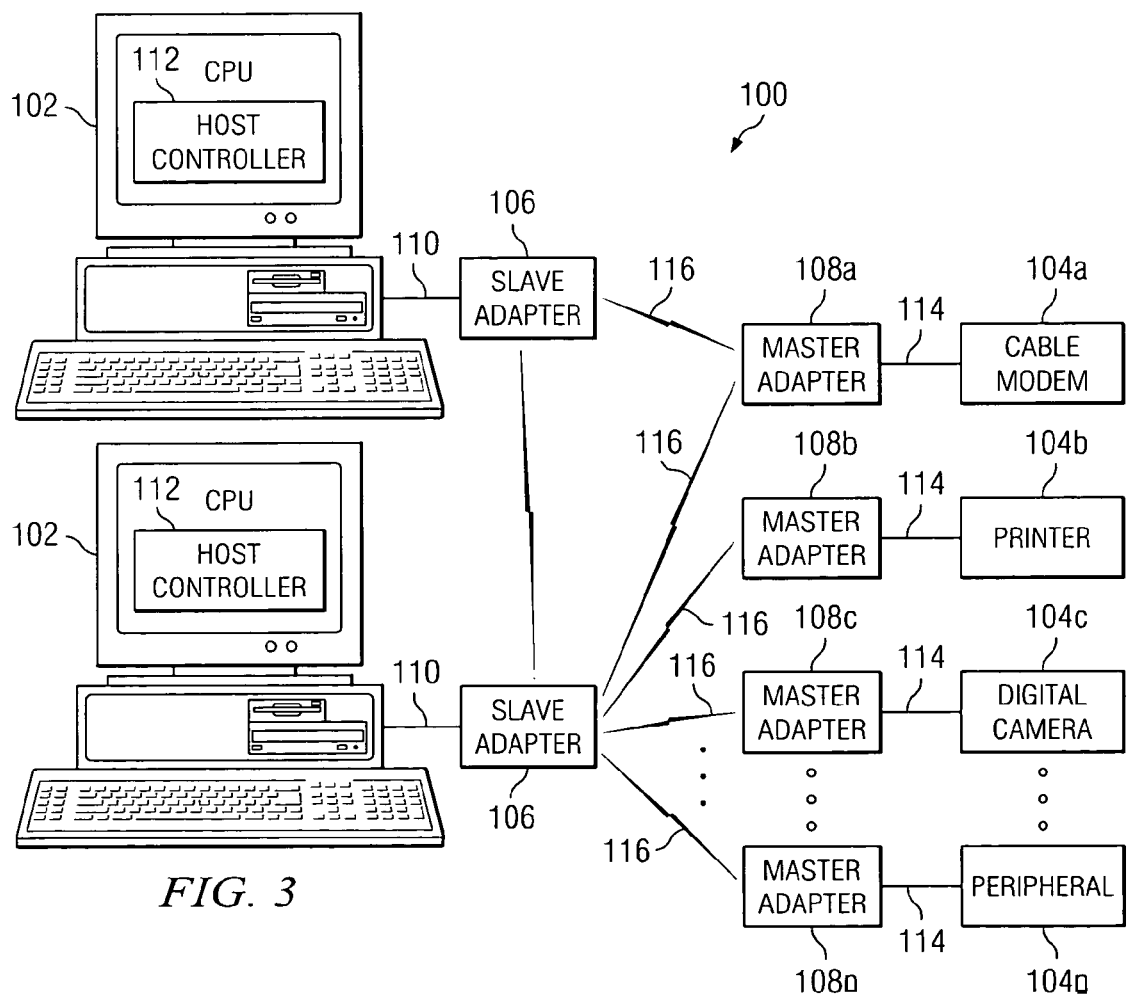
FIG. 3 illustrates a system that allows multiple computers to communicate with multiple peripherals using wireless connections.

FIG. 3 shows another embodiment of a system 100 that allows computers 102 to communicate with peripherals 104a, 104b, 104c, . . . , 104n (collectively referred to as "peripherals 104") using slave adapters 106 and master adapters 108a, 108b, 108c, . . . , 108n (collectively referred to as "master adapters 108"). The components depicted in FIG. 3 correspond to the like components of FIG. 1. Physical connections 110 couple computers 102 to slave adapters 106, while physical connections 114 couple master adapters 108 to peripherals 104. FIG. 3, however, also illustrates that system 100 may include wireless connections between slave adapters 106 and master adapters 108 in a variety of combinations, not limited to a single slave adapter 106 wirelessly connected to a single master adapter 108.

In particular embodiments, slave adapter 106 may maintain multiple wireless connections 116 with multiple master adapters 108. This allows computer 102 to remotely interact with several peripherals 104 using a single physical connection 110. In this manner, slave adapter 106 acts as a wireless hub that allows multiple peripherals 104 to share a single port, where normally, each peripheral 104 might require a separate port. One example of such an embodiment uses the BLUETOOTH "PicoNet" that allows a BLUETOOTH device to act as a master for multiple slave devices simultaneously. In embodiments using secure authentication, slave adapter 106 accepts connections only from master adapters 108 that share the correct encryption key.

In other embodiments, multiple slave adapters 106 may communicate with a single master adapter 108 coupled to a peripheral 104. This allows multiple computers 102 in a wireless neighborhood to access the same peripheral 104. Such an embodiment may use the BLUETOOTH "ScatterNet." ScatterNet allows multiple master devices, such as computers 102, to interact with multiple slave devices, such as peripherals 104. By combining the multiple slave and multiple master capability of ScatterNet with the wireless-to-physical communication capability of adapters 106 and 108, computers 102 may interact with multiple peripherals 104 and even other computers 102 using slave adapter 106.

As noted, in addition to sharing peripherals 104, slave adapters 106 may also communicate with one another, allowing computers 102 to share files, applications and other forms of information. This effectively creates a wireless network of shared computing and peripheral resources. In particular, the use of self-registering slave adapters 106 controlled by driver software in computer 102 may greatly increase the versatility of the wireless network, allowing slave adapters 106 to exchange customized information with one another. More generally, various software applications may extend the capabilities to slave adapters 106 to allow use with hands-free headsets or other wireless devices as well as conventional USB peripherals 104.

In the depicted embodiment, peripherals 104 may also communicate directly with one another. For example, a peripheral 104 such as a digital camera 104c may communicate with printer 104b using their corresponding master adapters 108b and 108c. This allows camera 104c to transfer digital pictures directly to printer 104b using a wireless connection without the need for an intervening computer 102. Such peer-to-peer communications may greatly increase the portability and versatility of specialized peripherals, such as allowing the use of portable photo printers virtually anywhere.

Because of the complex array of component interaction within system 100, system 100 may also include management capabilities in adapters 106 and 108 or additional components of system 100, such as network hubs or servers, in order to maintain registration information, locate peripherals 104 within system 100, and monitor active connections. Such functionality can be localized in a single component accessible by adapters 106 or 108, distributed among illustrated components of system 100, or otherwise suitably incorporated into system 100.

In particular embodiments, master adapters 108 and slave adapters 106 may automatically pair with each other to enable communication between computers 102 and peripherals 104 via wireless connections 116, as described above. In particular embodiments, a slave adapter 106 may automatically pair with one master adapter 108. In particular embodiments, a slave adapter 106 may automatically pair with multiple master adapters 108. In particular embodiments, a master adapter 108 may automatically pair with one slave adapter 106. In particular embodiments, a master adapter 108 may automatically pair with multiple slave adapters 106.

FIG. 4 illustrates the components of a particular embodiment of slave adapter 106. Slave adapter 106 includes a processor 202, a USB core 206, such as, for example, a USB 1.1 logic module, and a memory 208. Slave adapter 106 communicates with other devices using a radio frequency (RF) interface 210 and a USB interface 212. In general, slave adapter 106 provides wireless connectivity to a remote peripheral 104, while allowing computer 102 to interact with the remote peripheral 104 as if the peripheral 104 were connected to computer 102 using a wireline connection.

Processor 202 represents any combination of hardware and/or software for processing information. In particular applications, processor 202 is sometimes referred to as a "baseband processor" because it handles information exchange with RF interface 210. Processor 202 may include microprocessors, micro-controllers, DSPs, or other suitable components. USB 1.1 logic module 206 is another processor that handles USB protocol exchanges between slave adapter 106 and computer 102. In particular, USB core 206 allows slave adapter 106 to establish USB communication connections with computer 102 when coupled to computer 102, thus allowing slave adapter 106 to appear as a peripheral to computer 102.

RF interface 210 represents hardware and/or software for generating wireless RF signals from information and for receiving wireless signals and extracting information from them, including components such as antennas, power supplies and oscillators. USB interface 212 represents any port or connection, whether real or virtual, that allows slave adapter 106 to exchange information with computer 102 in a format specified by USB protocol. USB interface 212 may include active and passive components for receiving and transmitting electrical signals, such as amplifiers, filters, and other suitable components. USB core 206 regulates the information exchange by USB interface 212. In a particular embodiment, USB interface 212 includes a "B" type USB connector that is soldered to a printed circuit board of slave adapter 106, so that the USB connector is integral to adapter 106.

Memory 208 represents any form of information storage, whether volatile or non-volatile, including magnetic media, optical media, removable media, random access memory (RAM), read-only memory (ROM), or flash memory. Memory 208 stores software layers 214 executed by various components of slave adapter 106 to perform particular operations. Wireless layer 216 is executed by processor 202 to manage RF connections with other devices and generally controls the operation of RF interface 210. Wireline layer 220 is executed by processor 202 to perform operations associated with the wireline protocol, such as controlling various operations of USB core 206. Application layer 218 is executed by processor 202 to perform conversions between wireless and wireline formats, including amalgamating packets, affixing additional header information, or other suitable conversions. Finally, code 222 represents other instructions that may be executed by processor 202, such as applications that allow slave adapter 106 to interact with driver software of computer 102.

In operation, USB core processes data received from computer 102 by USB interface 212 and communicates data to computer 102 in USB format using USB interface 212. In a particular embodiment, USB core 206 communicates registration information for slave adapter 106 to computer 102, and in response, computer 102 establishes a USB connection with slave adapter 106. In an alternative embodiment, slave adapter 106 remains inactive until wireless connection 116 is established with master adapter 108 connected to peripheral 104. Using RF interface 210, slave adapter 106 monitors for an incoming communication request from master adapter 108, and if a request is received, slave adapter 106 accepts the request, thus establishing wireless connection 116.

To communicate information from computer 102 to master adapter 108, slave adapter 108 first receives information from computer 102 using USB interface 212. USB core 206 communicates the information to processor 202 for any suitable conversion or other processing. For example, processor 202 may convert the information from a wireline format to a wireless packet with a data type specified by profile 222. Processor 202 then presents the information to RF interface 212. RF interface 212 converts the information into a radio signal that is communicated to master adapter 108.

Slave adapter 106 also receives information from master adapter 108 over wireless connection 116. RF interface 210 extracts information from the wireless signal. Processor 202 converts the packets from a wireless format to a wireline format and presents the information to computer 102 in a suitable manner. For example, if there are multiple packets received from several peripherals 104, processor 202 may break the packets up and communicate them separately to computer 102 in a predetermined order.

Particular embodiments of slave adapter 106 use secure wireless communication. In such embodiments, encryption key 224 may be stored in memory 208. Encryption key 224 represents any public and/or private key used by slave adapter 106, which may be inherent to a wireless communication protocol, such as 802.11, or may be a unique encryption key 224 matching a similar key held by master adapter 108. In cases where encryption key 224 is unique, slave adapter 106 may be programmed using an encryption module 226 that couples to USB interface 212 of slave adapter 106. In a particular embodiment, encryption module 226 generates a unique encryption key 224 when slave adapter 106 and master adapter 108 are coupled to encryption module 226, thus providing a unique encryption key 226 held commonly by slave adapter 106 and master adapter 108. Alternatively, encryption module 226 may program any device coupled to it with the same encryption key 224, rather than generating a new key for each pair of devices. In particular embodiments, memory 208 of slave adapter 106 may include automatic-pairing data 228 that slave adapter 106 may use to automatically pair with one or more master adapters 108, as described above. Automatic-pairing data 228 may include one or more PSMs of slave adapter 106, one or more passwords of slave adapter 106, and any other suitable automatic-pairing data 228.

Figure 5:
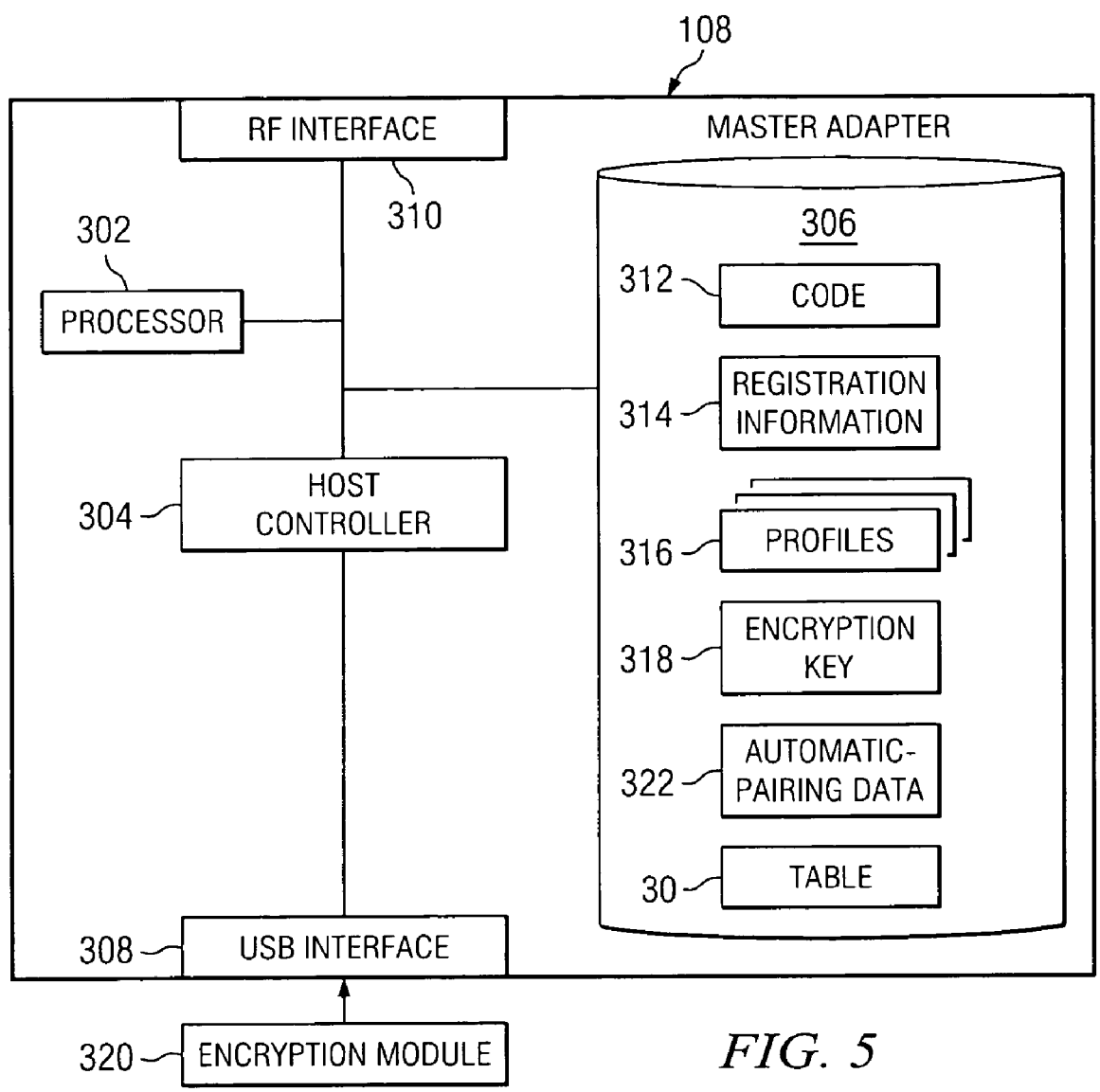
FIG. 5 illustrates one embodiment of a master adapter used in the system of FIGS. 1 or 3.

FIG. 5 illustrates a particular embodiment of master adapter 108. In the depicted embodiment, master adapter 108 includes a processor 302, a host controller 304, a memory 306, a USB interface 308 and an RF interface 310. Processor 302, memory 306, USB interface 308, and RF interface 310 are analogous in structure and function to the like components of slave adapter 106, and any of the like components described in conjunction with the slave adapter 106 of FIG. 3 may be used in master adapter 108 as well. Host controller 304 represents hardware and/or software that manages information transfers between master adapter 108 and peripherals 104. In particular, host controller 304 detects peripherals 104 coupled to USB interface 308, obtains registration information for those peripherals 104, and establishes communication connections with the peripherals 104. Host controller 104 also regulates information flow between master adapter 108 and peripheral 104. Host controller 104 may include any suitable components for processing information and executing logical instructions, including management of hardware and protocol layers of USB communication.

In an alternative embodiment of master adapter 108, host controller 304 includes logic for On the Go (OTG) operation in USB, which is included in USB 2.0 logic modules. OTG allows a device to function as both a master USB device and a slave USB device. Such capabilities are particularly useful in systems such as system 100 depicted in FIG. 3, because they allow slave adapters 106 to function as master USB devices when communicating with peripherals 104 and as slaves or masters when communicating with other computers 102. Thus, computers 102 have greater versatility when interacting with other devices in system 100.

Memory 306 stores code 312 executed by processor 302 to perform various tasks of master adapter 108. Memory 306 may also maintain registration information 314, which may include USB endpoint information, for peripherals 104 coupled to USB interface 308. Registration information 314 is used by master adapter 108 to identify peripherals 104 and to manage communication connections with peripherals 104. For example, in a USB embodiment, registration information 314 may include a device identifier the indicates a type of device to a "plug and play" system. Master adapter 108 also maintains profiles 316 for organizing data according to data type, appending suitable headers, converting data from wireless packets, and other tasks specific to the type of data received from peripheral 104. In particular embodiments, memory 306 of master adapter 108 may include automatic-pairing data 332 that master adapter 108 may use to automatically pair with one or more slave adapters 106, as described above. Automatic-pairing data 332 may include one or more PSMs of master adapter 108, one or more passwords of master adapter 108, or any other suitable automatic-pairing data 332. In particular embodiments, memory 306 of master adapter 108 may include one or more tables 30, as described above.

In operation, master adapter 108 detects a peripheral 104 coupled to USB interface 308 and establishes a communication connection with peripheral 104. Master adapter 108 thus becomes a master device over peripheral 104. Master adapter 108 also detects slave adapter 106 within range of RF interface 310, and establishes wireless connection 116 with slave adapter 106. Once wireless connection 116 is established, master adapter 108 communicates registration information 314 to slave adapter 106, allowing slave adapter 106 to establish a virtual connection between computer 102 and peripheral 104. Effectively, master adapter 108 acts as a transparent connection between computer 102 and peripheral 104. Because of the functionality provided by host controller 304, peripheral 104 recognizes information from master adapter 108 as coming from a USB host.

During information exchanges between computer 102 and peripheral 104, master adapter 108 performs various intermediate tasks to provide a transparent USB connection. For example, if master adapter 108 is one of several master adapters 108, master adapter 108 may store information received from peripheral 104 in packets with a ScatterNet header or other suitable identifier to distinguish the particular peripheral 104 as well as the information type. Master adapter 108 also regulates the exchange of packets with peripheral 104 in terms of classifying information types, regulating the timing of packet delivery, performing any suitable protocol conversion, and generally providing support for the USB connection between computer 102 and peripheral 104.

Particular embodiments of master adapter 108 use secure wireless communication. In such embodiments, encryption key 318 may be stored in memory 306. Encryption key 318 represents any public and/or private key used by master adapter 108, which may be inherent to a wireless communication protocol, such as 802.11, or may be a unique encryption key 318 matching a similar key held by slave adapter 106. In cases where encryption key 318 is unique, master adapter 108 may be programmed using an encryption module 320 that couples to USB interface 308 of master adapter 108. In a particular embodiment, encryption module 320 generates a unique encryption key 318 when slave adapter 106 and master adapter 108 are coupled to encryption module 320, thus providing a unique encryption key 318 held commonly by slave adapter 106 and master adapter 108. Alternatively, encryption module 320 may program any device coupled to it with the same encryption key 318, rather than generating a new key for each pair of devices.

Figure 6:
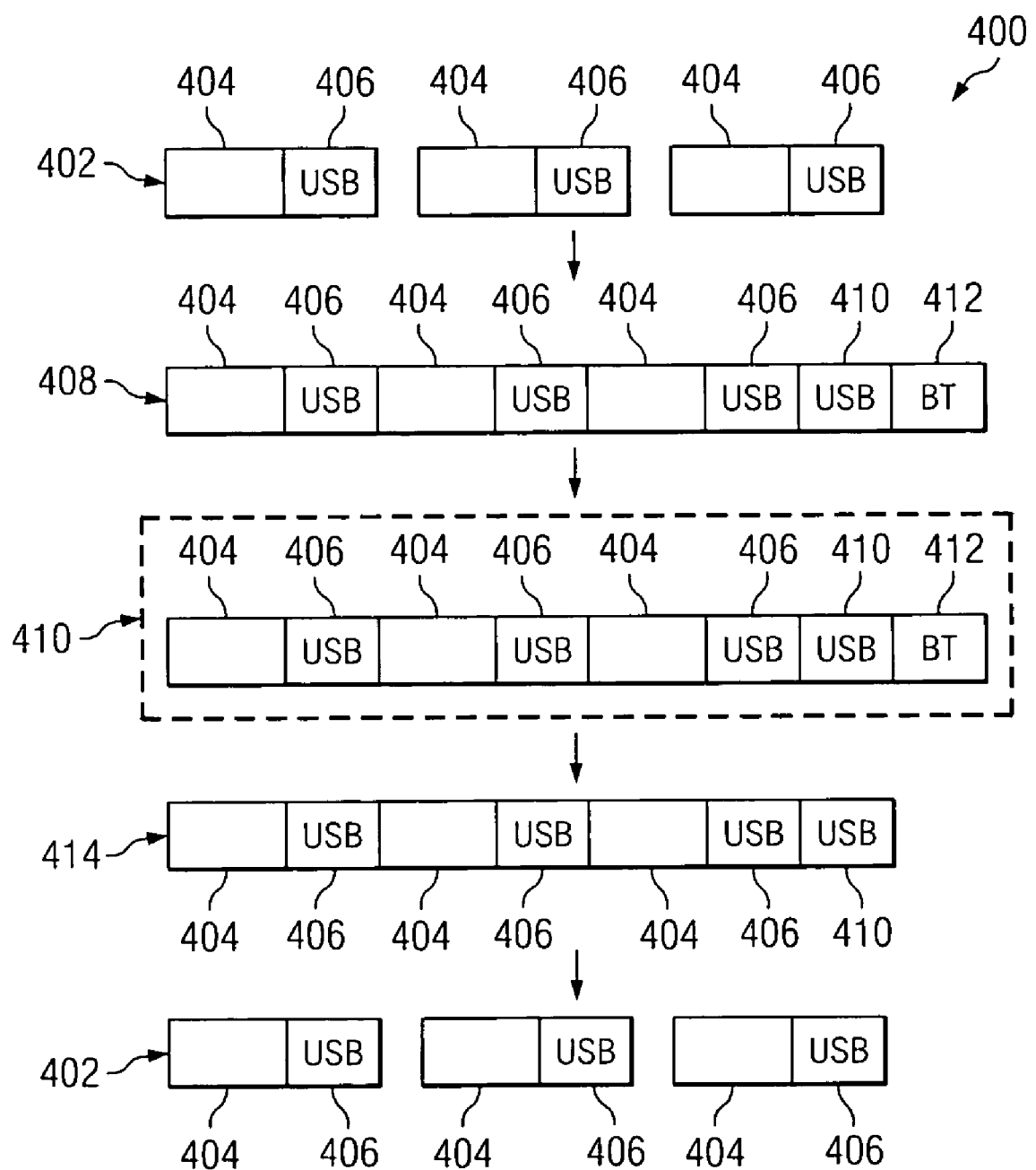
FIG. 6 illustrates an example of information packets communicated in the system of FIGS. 1 or 3.

FIG. 6 illustrates an example of a packet flow diagram 400 for system 100. Adapter 106 or 108 receives USB packets 402 from a device. Packets 402 represents information received from a device by one of the adapters 106 or 108 and formatted according to a particular protocol. Packet 402 includes a header 404 and a payload 406. Header 404 stores information used to assist downstream components in identifying, classifying, and routing packet 402. Examples of information stored in header 404 include packet identifiers, vendor identifiers, product identifiers or any other suitable identifying information. Payload 406 is the information that a device is communicating to a destination, as distinguished from header information, which specifies how the information is handled. For example, payload 406 may include commands, files, voice information, video, streaming media, or any other suitable form of information. The depicted USB packets 402 are only one example of the format for packets, and other embodiments may include suitable modifications, such as omission of headers 404 or addition of information to the end of packets 402.

Packets 402 may be accumulated in a buffer until a predetermined number of packets are collected. Packets 402 are then amalgamated into a wireless packet 408. Wireless packet 408 includes an additional USB header 410 that may be used by a receiving adapter 106 or 108 to separate the information into its component parts. Wireless packet 408 also contains a BLUETOOTH header 412 that includes information used by the BLUETOOTH protocol to communicate wireless packet as an RF signal 410.

Adapter 106 or 108 that receives RF signal 410 uses the information in BLUETOOTH header 412 to extract the information 414 from wireless packet 408. Receiving adapter 106 or 108 then examines USB header 410 to identify USB packets 402 within information 414. Once adapter 106 or 108 has identified USB packets 402, adapter 106 or 108 separates packets 402 and communicates them in an appropriate manner to an attached device.

In particular embodiments, slave adapter 106 specifies a size for packets 402 using hardware limitation messages in the USB protocol. Thus, for example, slave adapter 106 may limit the packet sizes received from computer 102 to 32-*byte* packets, even when computer 102 would ordinarily use 64-byte packets, such as those typically used by USB printers. One advantage of such embodiments is that they allow slave adapter 106 to fix the size of wireless packet 408, which may increase the efficiency of wireless connection 116. The appended USB header 410 is used by master adapter 108 to determine the appropriate packet size limitation according to a shared protocol, and therefore, master adapter 108 may communicate the information to peripheral 104 in the form that peripheral 104 expects.

Adapters 106 or 108 may also communicate different types of information in other ways than the format described. For example, when USB protocol is used to manage physical connections, adapters 106 or 108 may communicate USB control tokens directly without accumulating them into wireless packets 408. This allows adapters 106 and 108 to preserve the timing of token exchange between computer 102 and peripheral 104, reducing the likelihood of errors when computer 102 and peripheral 104 are establishing connections and exchanging information.

Figure 7:
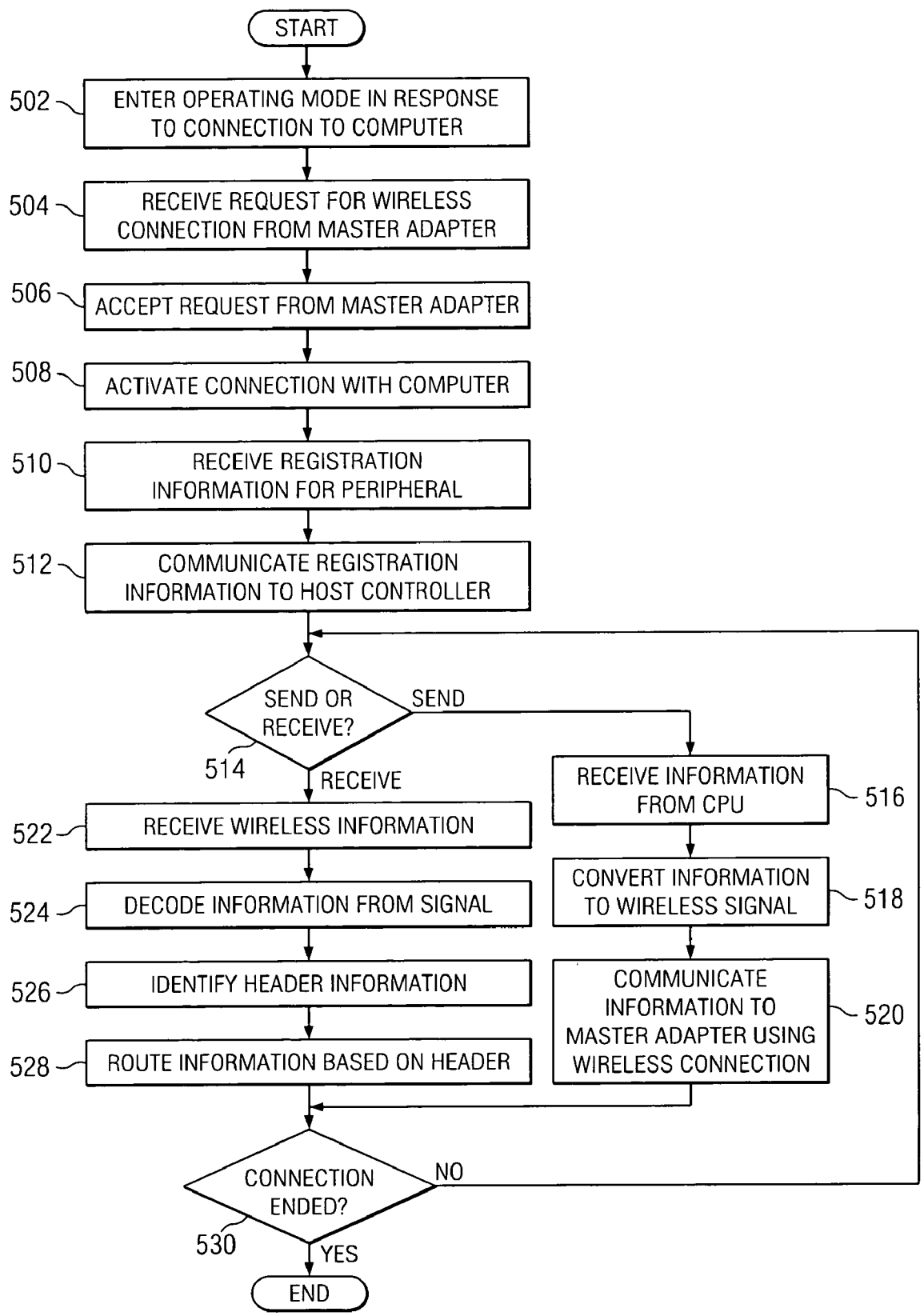
FIG. 7 illustrates an example method for operation of a slave adapter.

FIG. 7 shows a flow chart 500 that illustrates one example of a method of operation for slave adapter 106 in which slave adapter 106 remains inactive until a wireless connection is established with master adapter 108. Slave adapter 106 becomes operation in response to detecting a connection to computer 102 at step 502. Slave adapter 106 receives a request for a wireless connection from master adapter 108 at step 504. Slave adapter 106 accepts the request for the wireless connection at step 506, thus establishing wireless connection 116. Once the wireless connection is established, slave adapter 106 activates its connection to computer 102 at step 508, which enables information exchange between computer 102 and slave adapter 106. Slave adapter 106 receives registration information for a peripheral 104 connected to master adapter 108 at step 510 and communicates the registration information to a host controller of computer 102 at step 512, allowing computer 102 to recognize peripheral 104. Once peripheral 104 is registered with computer 102, slave adapter 106 may send and receive information from peripheral 104 using wireless connection 116, which in turn allows computer 102 to interact with peripheral 104 as if peripheral 104 were connected to computer 102 with a wireline connection.

To send information, slave adapter 106 first receives information from computer 102 at step 516. Slave adapter 106 then converts the information to a wireless signal at 518. This conversion may involve changing the information from one format, such as serial data, to another format suitable for wireless communication, such as BLUETOOTH packets. Slave adapter 106 then communicates the wireless signal to master adapter 108 using the wireless connection at step 520. At step 530, slave adapter 106 continues to send and receive information from step 636 until the communication connection with master adapter 108 or computer 102 ends.

To receive information, slave adapter 106 receives a wireless signal from master adapter 108 at step 522. Slave adapter 106 extracts information from the wireless signal at step 524 and identifies header information at step 526. Based on the header information, slave adapter 106 routes the information appropriately. Routing the information at this step may include performing suitable conversions to present the information in a suitable format to computer 102. At step 530, slave adapter 106 continues to send and receive information from step 636 until the communication connection with master adapter 108 or computer 102 ends.

Figure 8:
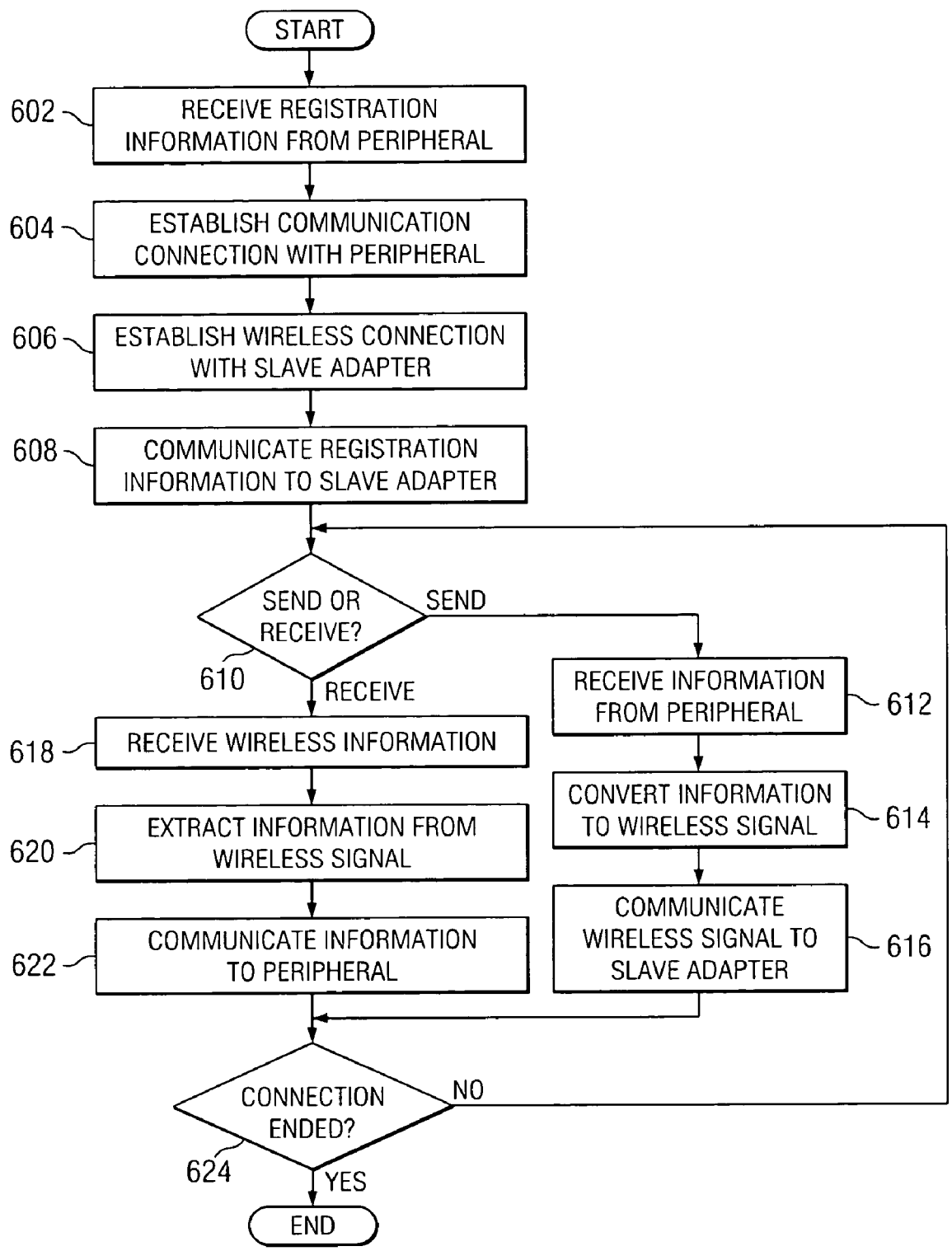
FIG. 8 illustrates an example method for operation of a master adapter.

FIG. 8 illustrates an example method for operation of a master adapter. Although the described steps are presented in a particular order, it should be understood that the steps may be performed in a different order, and various steps may be omitted or replaced without changing the overall operation of the method. Master adapter 108 receives registration information from a peripheral 104 at step 602 and establishes a communication connection with peripheral 104 at step 604. Master adapter 108 detects a slave adapter 106 and establishes a wireless connection with slave adapter 106 at step 606. In response to a request for registration information from computer 102, master adapter 108 communicates the registration information for peripheral 104 to slave adapter 106 at step 608. The registration information is used by slave adapter 106 to allow computer 102 to recognize peripheral 104. Once all of the communication connections are established, master adapter 108 may then send information to computer 102 to receive information from computer 102, as indicated by decision step 610.

To send information, master adapter 108 first receives information from peripheral 104 at step 612. Master adapter 108 converts the information into a wireless signal at step 614. This conversion may include formatting the information from peripheral 104 into a suitable form, such as BLUETOOTH packets. Master adapter 108 then communicates the information to slave adapter 106 at step 616. At step 624, master adapter 108 continues to send and receive information from step 514 until the connection with either slave adapter 106 or computer 102 ends.

To receive information, master adapter 108 receives a wireless signal from slave adapter 106 at step 618. Master adapter 108 extracts information from the wireless signal at step 620. Master adapter 108 may also perform any suitable conversions of the information to a form usable by peripheral 104, such as converting BLUETOOTH packets to USB frames. Master adapter 108 then communicates the information to peripheral 104 at step 622. At step 624, master adapter 108 continues to send and receive information from step 514 until the connection with either slave adapter 106 or computer 102 ends.

Figure 9:
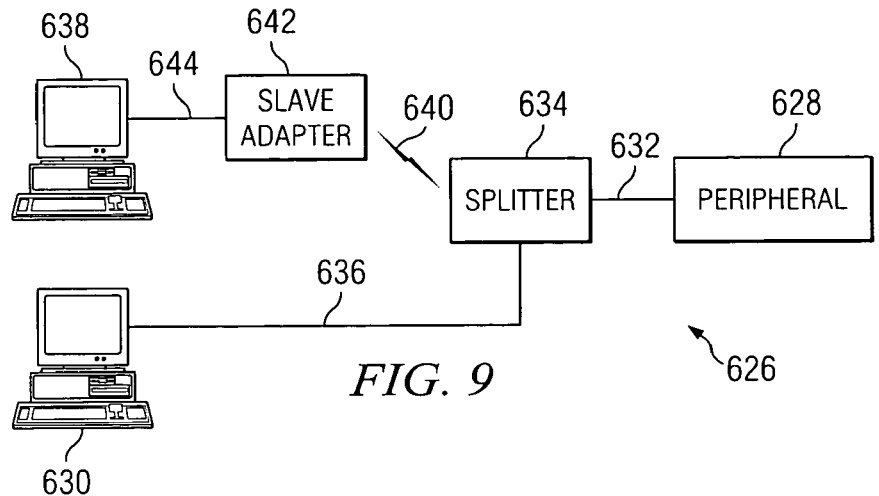
FIG. 9 illustrates an example system for providing both wireline and wireless connections to a wireline interface.

FIG. 9 illustrates an example system 626 for providing both wireline and wireless connections to a wireline interface. System 626 includes a peripheral 628 that may communicate with a first computer 630 via a first physical connection 632, a splitter 634, and a second physical connection 636. Peripheral 628 may also communicate with a second computer 638 via first physical connection 632, splitter 634, a wireless connection 640, a slave adapter 642, and a third physical connection 644. Splitter 634 allows both wireline communication between peripheral 628 and first computer 630 and wireless communication between peripheral 628 and second computer 638. Peripheral 628 is similar in function to peripherals 14 and 104; physical connections 632, 636, and 644 are similar in function to physical connections 20, 24, 110, and 114; computers 630 and 638 are similar in function to computers 12 and 102; slave adapter 642 is similar in function to slave adapters 16 and 106; and wireless connection 640 is similar in function to wireless connections 26 and 116.

Splitter 634 allows communication between peripheral 628 and first computer 630 and between peripheral 628 and second computer 638. In particular embodiments, splitter 634 has a first state and a second state. In the first state, splitter 634 allows wireline communication between peripheral 628 and first computer 630. Communication between peripheral 628 and first computer 630 is wireline in that peripheral 628 does not use a wireless connection to communicate with first computer 630. In the second state, splitter 634 allows wireless communication between peripheral 628 and second computer 638. Communication between peripheral 628 and second computer 638 is wireless in that peripheral 628 uses wireless connection 640 to communicate with second computer 630. In particular embodiments, communication between peripheral 628 and second computer 638 may involve more than one wireless connection.

Splitter 634 selectively alternates between these two states. In particular embodiments, the first state is a default state of splitter 634. When communication is requested between peripheral 628 and second computer 638, splitter 634 switches to the second state to allow the requested communication. When the communication finishes, splitter 634 returns to the first state. In addition or as an alternative, splitter 634 can return to the first state when a timeout occurs, a maximum communication time elapses, or a maximum data amount is communicated. In particular embodiments, if peripheral 628 is communicating with first computer 630 when the request is received, splitter 634 interrupts the communication between peripheral 628 and first computer 630 to allow the requested communication. As an alternative, in other embodiments, splitter 634 delays the requested communication until the communication between peripheral 628 and first computer 630 finishes.

Figure 10:
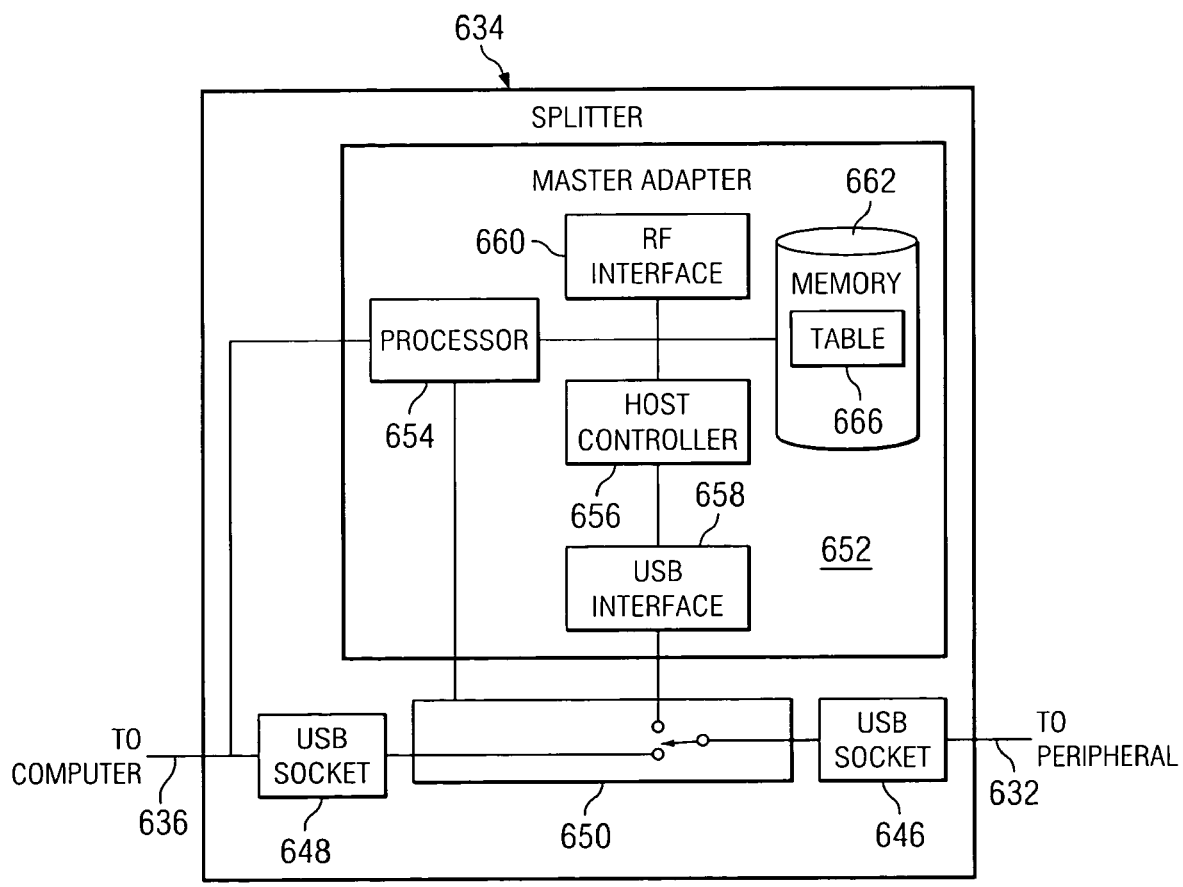
FIG. 10 illustrates an example splitter of a system for providing both wireline and wireless connections to a wireline interface.

FIG. 10 illustrates an example splitter 634 of system 626. Splitter 634 includes first and second USB sockets 646 and 648, a switch 650, and a master adapter 652. First and second USB sockets 646 and 648 are type A and type B sockets, respectively. First USB socket 646 couples splitter 634 to peripheral 628, and second USB socket 648 couples splitter 634 to first computer 630. Although particular sockets are illustrated and described, the present invention contemplates any suitable sockets. As an example, in particular embodiments, sockets 646 and 648 need not be USB sockets, but can be sockets to support any suitable communication protocol or standard. In particular embodiments, power is supplied to splitter 634 from first computer 630. To allow communication between peripheral 628 and first computer 630, switch 650 provides a physical connection between first and second sockets 646 and 648. To allow communication between peripheral 628 and second computer 638, switch 650 provides a physical connection between first socket 646 and master adapter 652. Although splitter 634 is described and illustrated as a single device, the present invention also contemplates splitter 634 including two or more devices that are more or less separate from each other. As an example and not by way of limtiation, in particular embodiments, a first device may include master adapter 652 and a second device may include USB sockets 646 and 648 and switch 650. A physical connection may couple the first device to the second device, and signal control for switch 650 may be communicated between master adapter 652 and switch 650 over the physical connection. One or more of these embodiments may enable a user to add a physical connection 636 to a system 10, 100, 626, or 664 without adding a master adapter 18, 108, or 652 to system 10, 100, 626, or 664. In addition or as an alternative, one or more of these embodiments may enable a user to install one or more components of a system 10, 100, 626, or 664 without taking down an existing physical connection between a computer and a peripheral. In addition or as an alternative, one or more of these embodiments may reduce costs associated with manufacturing splitter 634.

Master adapter 652 is similar in function to master adapters 18 and 108, but provides additional functionality. Master adapter 652 includes a processor 654, a host controller 656, a USB interface 658, an RF interface 660, and a memory 662. Host controller 656, USB interface 658, and RF interface 660 are similar in function to host controller 304, USB interface 308, and RF interface 310, respectively. Processor 654 is similar in function to processor 302, but provides additional functionality. Although a particular interface is illustrated and described between switch 650 and master adapter 652, the present invention contemplates any suitable interface. As an example, in particular embodiments, USB interface 658 need not be a USB interface. In particular embodiments, processor 654 can detect communication across second physical connection 636. Processor 654 can also determine whether a request is pending for communication between peripheral 628 and second computer 638. Processor 654 can also instruct switch 650 to provide a physical connection between first and second USB sockets 646 and 648 or between first USB socket 646 and USB interface 658 of master adapter 652. By providing a physical connection between first USB socket 646 and USB interface 658, switch 650 effectively provides a physical connection between first USB socket 646 and RF interface 660.

When switch 650 provides a physical connection between first and second USB sockets 646 and 648, peripheral 628 may communicate with first computer 630. As described above, communication between peripheral 628 and first computer 630 is wireline in that peripheral 628 does not use a wireless connection to communicate with first computer 630. Accordingly, when processor 654 instructs switch 650 to provide a physical connection between first and second USB sockets 646 and 648, processor 654 instructs switch 650 to allow wireline communication between peripheral 628 and first computer 630. When switch 650 provides a physical connection between first USB socket 646 and RF interface 660 via USB interface 658, peripheral 628 may communicate with second computer 638. As described above, communication between peripheral 628 and second computer 638 is wireless in that peripheral 628 uses wireless connection 640 to communicate with second computer 638.

In particular embodiments, processor 654 instructs switch 650 according to the status of communication across second physical connection 636 and pending requests for communication between peripheral 628 and second computer 638. As an example, in particular embodiments, if second physical connection 636 is inactive and no request is pending for communication between peripheral 628 and second computer 638, processor 654 instructs switch 650 to provide a physical connection between first and second USB sockets 646 and 648. This allows communication between peripheral 628 and first computer 630. If processor 654 receives a request for communication between peripheral 628 and second computer 638 and second physical connection 636 is inactive, processor 654 instructs switch 650 to provide a physical connection between first USB socket 646 and RF interface 660 via USB interface 658. This allows the requested communication between peripheral 628 and second computer 638. If processor 654 receives a request for communication between peripheral 628 and second computer 638 and second physical connection 636 is active, processor 654 waits until second physical connection 636 becomes inactive and then instructs switch 650 to provide a physical connection between first USB socket 646 and RF interface 660 via USB interface 658 to allow the requested communication. In addition or as an alternative, processor 654 can wait until a timeout occurs, a maximum communication time elapses, or a maximum data amount is communicated to instruct switch 650 to provide a physical connection between first USB socket 646 and USB interface 658. This allows peripheral 628 to finish communication with first computer 630 before peripheral 628 starts communication with second computer 638.

Although splitter 634 is illustrated and described as allowing wireline communication between peripheral 628 and first computer 630 and allowing wireless communication between peripheral 628 and second computer 638, the present invention also contemplates splitter 634, in particular embodiments, providing wireline communication between peripheral 628 and first computer 630 and between peripheral 628 and second computer 638. As an example and not by way of limitation, master adapter 526 may be replaced by a USB type B or other suitable socket that may be coupled to second computer 638 by a physical connection. In particular embodiments, splitter 634 may provide any suitable number of these connections. The present invention also contemplates splitter 634, in particular embodiments, providing wireless communication between peripheral 628 and first computer 630 and between peripheral 628 and second computer 638. As an example and not by way of limitation, USB socket 648 may be replaced by a master adapter that may use a wireless connection to communicate with a slave adapter coupled to first computer 628. In particular embodiments, splitter 634 may provide any suitable number of these connections.

Memory 662 is similar in function to memory 306, but, in particular embodiments, contains additional information. In particular embodiments, memory 662 contains information that processor 654 uses to determine what instructions to give switch 650. As an example, in particular embodiments, memory 662 contains information specifying one or more timeouts, maximum communication times, or maximum communicated data amounts that processor 654 can use. As described more fully below, in particular embodiments, splitter 634 allows communication between peripheral 628 and multiple second computers 638 via multiple wireless connections 640. In some of these embodiments, memory 662 contains information that specifies a prioritization among second computers 638. In particular embodiments, each second computer 638 is identified in the prioritization by the BLUETOOTH address of slave adapter 642 corresponding to second computer 638. If more than one request is pending for communication between peripheral 628 and a second computer 638, processor 654 uses that information to determine which requested communication to allow first, which to allow second, and so on.

Figures 11, 12:
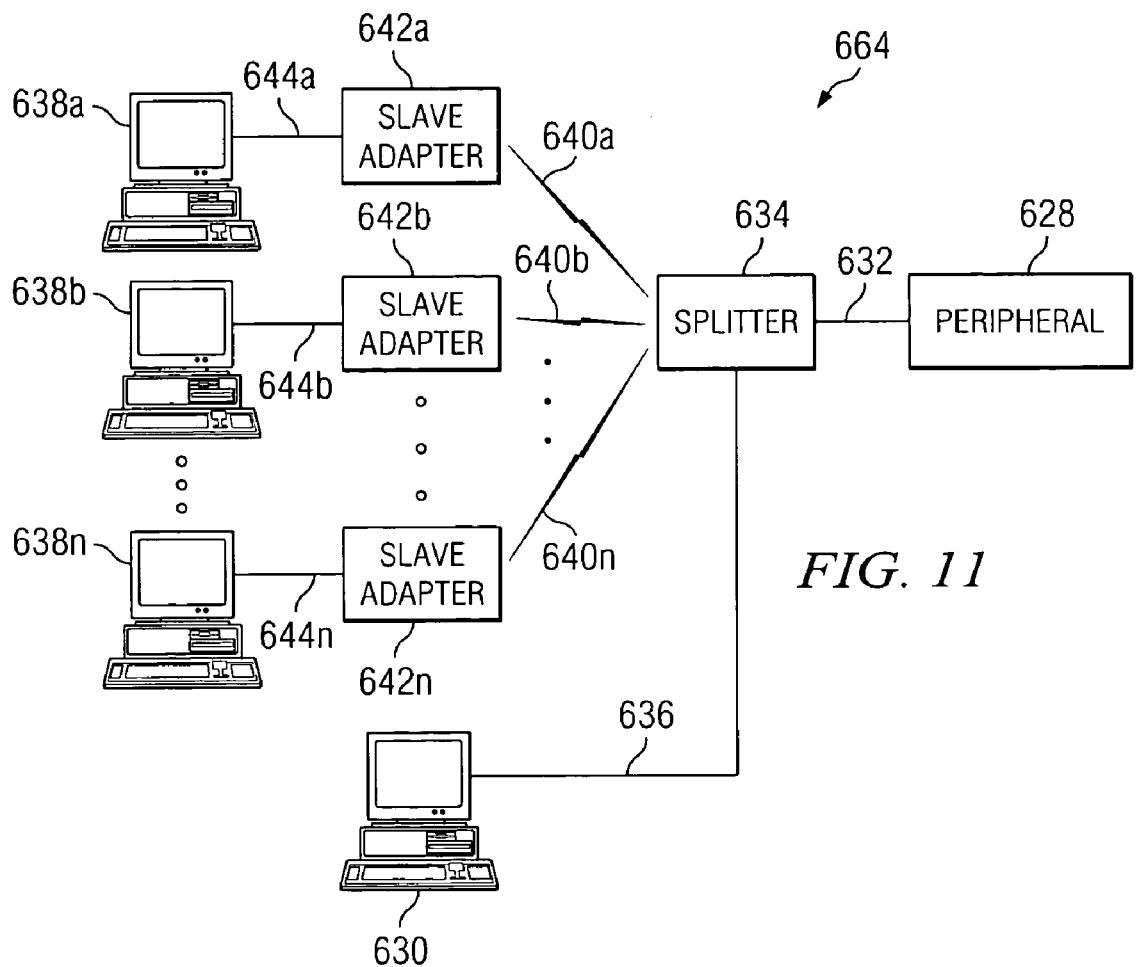
FIG. 11 illustrates an example system for providing both wireline and multiple wireless connections to a wireline interface.
FIG. 12 illustrates an example priority table of a system for providing both wireline and multiple wireless connections to a wireline interface.

FIG. 11 illustrates an example system 664 for providing both wireline and multiple wireless connections to a wireline interface. System 664 is similar to system 626, except that system 664 includes multiple second computer systems 638. When switch 650 provides a physical connection between first USB socket 646 and RF interface 660 via USB interface 658, one or more second computers 638 may communicate with peripheral 628. If more than one request is pending for communication between peripheral 628 and a second computer 638, processor 654 determines which requested communication to allow first, which to allow second, and so on. As described above, in particular embodiments, processor 654 uses information contained in memory 662 that specifies a prioritization among second computers 638. According to one prioritization, each second computer 638 is assigned one or more priority levels. Each priority level includes only one second computer 638. Processor 654 first allows second computer 638 of the highest priority level to communicate with peripheral 628; then allows second computer 638 of the next highest priority level to communicate with peripheral 628; then allows second computer 638 of the next highest priority level to communicate with peripheral 628; and so on, until processor 654 reaches the last priority level. In particular embodiments, if there is no communication request pending at a priority level, processor 654 immediately proceeds to the next priority level. If no communication request is pending between peripheral 628 and a second computer 638, processor instructs switch 650 to provide a physical connection between first USB socket 646 and second USB socket 648

FIG. 12 illustrates an example priority table 666 of system 664. Priority table 666 includes first and second columns 668 and 670 and multiple rows 672. Priority levels are specified in column 668, and BLUETOOTH addresses of slave adapters 642 are specified in column 670. While particular BLUETOOTH addresses may include forty-eight bits, BLUETOOTH addresses that include seven bits are shown for the sake of illustration. Each row 672 specifies a priority level and a corresponding BLUETOOTH address. As described above, according to one prioritization, second computers 638 are each assigned one or more priority levels and identified in priority table 666 by the BLUETOOTH address of slave adapter 642 corresponding to second computer 638. If more than one request is pending for communication between peripheral 628 and a second computer 638, processor 654 uses table 666 to determine which requested communication to allow first, which to allow second, and so on, as described above.

In particular embodiments, processor 654 first accesses row 672a and uses the BLUETOOTH address specified in row 672a to identify a second computer 638. If no communication request is pending between peripheral 628 and second computer 638, processor 654 accesses row 672b. If a communication request is pending between peripheral 628 and second computer 638, processor 654 allows the requested communication. When that communication finishes, a maximum time elapses, a maximum data amount is communicated, or a timeout occurs, processor 654 accesses row 672c. In particular embodiments, this process continues until after processor 654 has accessed last row 672n, at which point processor 654 returns to row 672a. In particular embodiments, priority table 666 is built manually. In particular embodiments, priority table 666 is built automatically when master adapter 652 establishes wireless connections 640. In particular embodiments, priority table 666 can be updated manually. In particular embodiments, priority table 666 can be automatically updated according to a dynamic prioritization.

Figure 13:
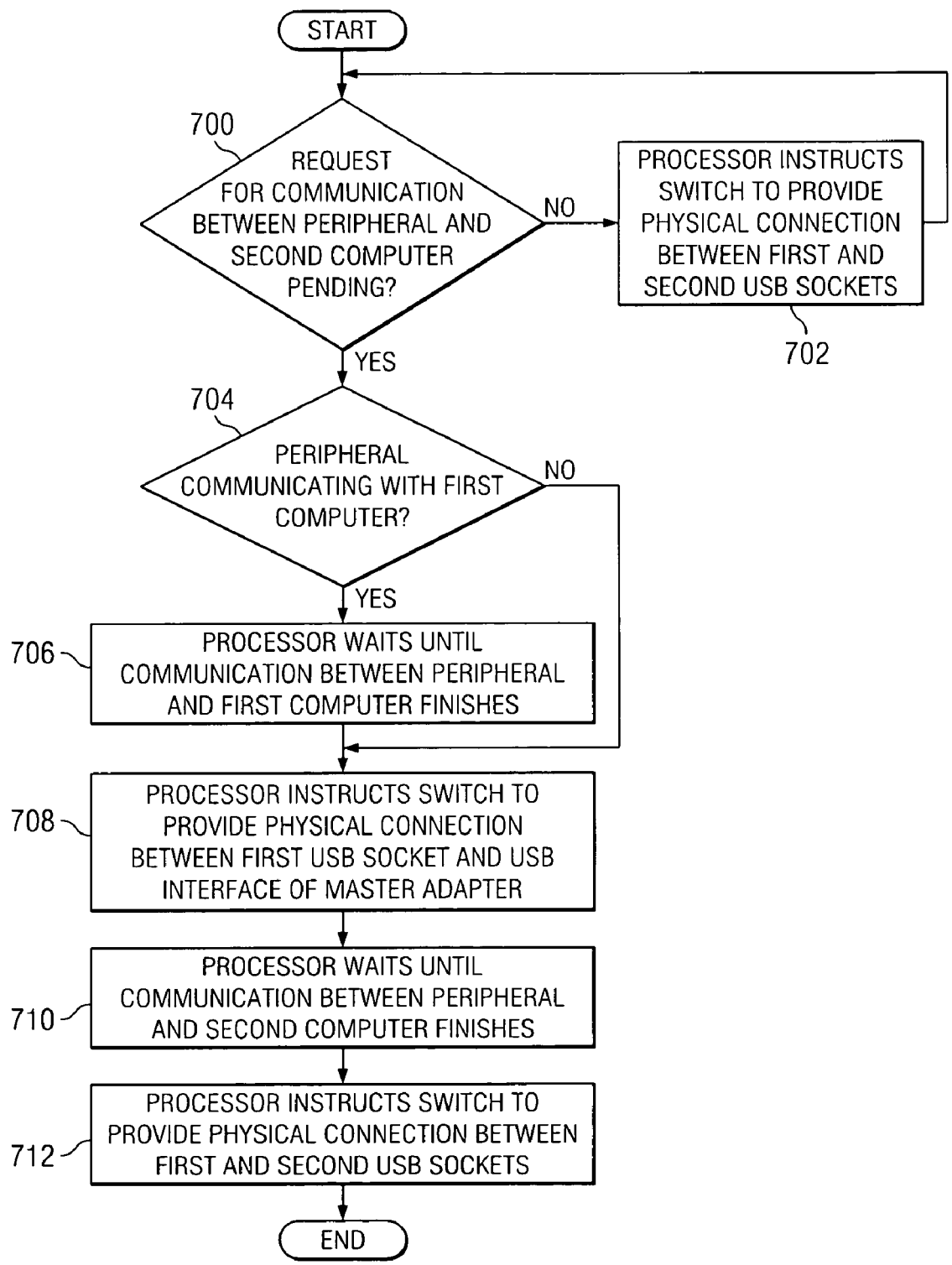
FIG. 13 illustrates an example method for providing both wireline and wireless connections to a wireline interface.

FIG. 13 illustrates an example method for providing both wireline and wireless connections to a wireline interface. The method starts at step 700, where, if a request for communication between peripheral and second computer system is not pending, the method proceeds to step 702. At step 702, processor 654 instructs switch 650 to provide a physical connection between first and second USB sockets 646 and 648 (which allows communication between peripheral 628 and first computer system 630), and the method returns to step 700. At step 700, if a request for communication between peripheral and second computer system is pending, the method proceeds to step 704. At step 704, if peripheral 628 is communicating with first computer system 630, the method proceeds to step 706. At step 706, processor 654 waits until the communication between peripheral 628 and first computer 630 finishes, at which point the method proceeds to step 708.

As described above, processor 654 may, in addition or as an alternative, wait only until a maximum communication time is reached, a maximum data amount is communicated, or a timeout occurs. As described above, in particular embodiments, processor 654 may interrupt the communication between peripheral 628 and first computer 630 and, to allow the requested wireless communication between peripheral 628 and second computer 638, instruct switch 650 to provide a physical connection between first USB socket 646 and RF interface 660 of master adapter 652 via USB interface 658. At step 704, if peripheral 628 is not communicating with first computer system 630, the method proceeds to step 708. At step 708, to allow the requested wireless communication between peripheral 628 and second computer 638, processor 654 instructs switch 650 to provide a physical connection between first USB socket 646 and RF interface 660 of master adapter 652 via USB interface 658.

At step 710, processor 654 waits until the communication between peripheral 628 and second computer 638 finishes. At step 712, processor 654 instructs switch 650 to provide a physical connection between first and second USB sockets 646 and 648, at which point the method ends. One or more steps of the method illustrated in FIG. 13 may, in particular embodiments, be just one instance of a loop. Although particular steps of the method illustrated in FIG. 13 are described and illustrated as occurring in a particular order, the present invention contemplates any suitable steps of the method described above occurring in any suitable order.

Figure 14:
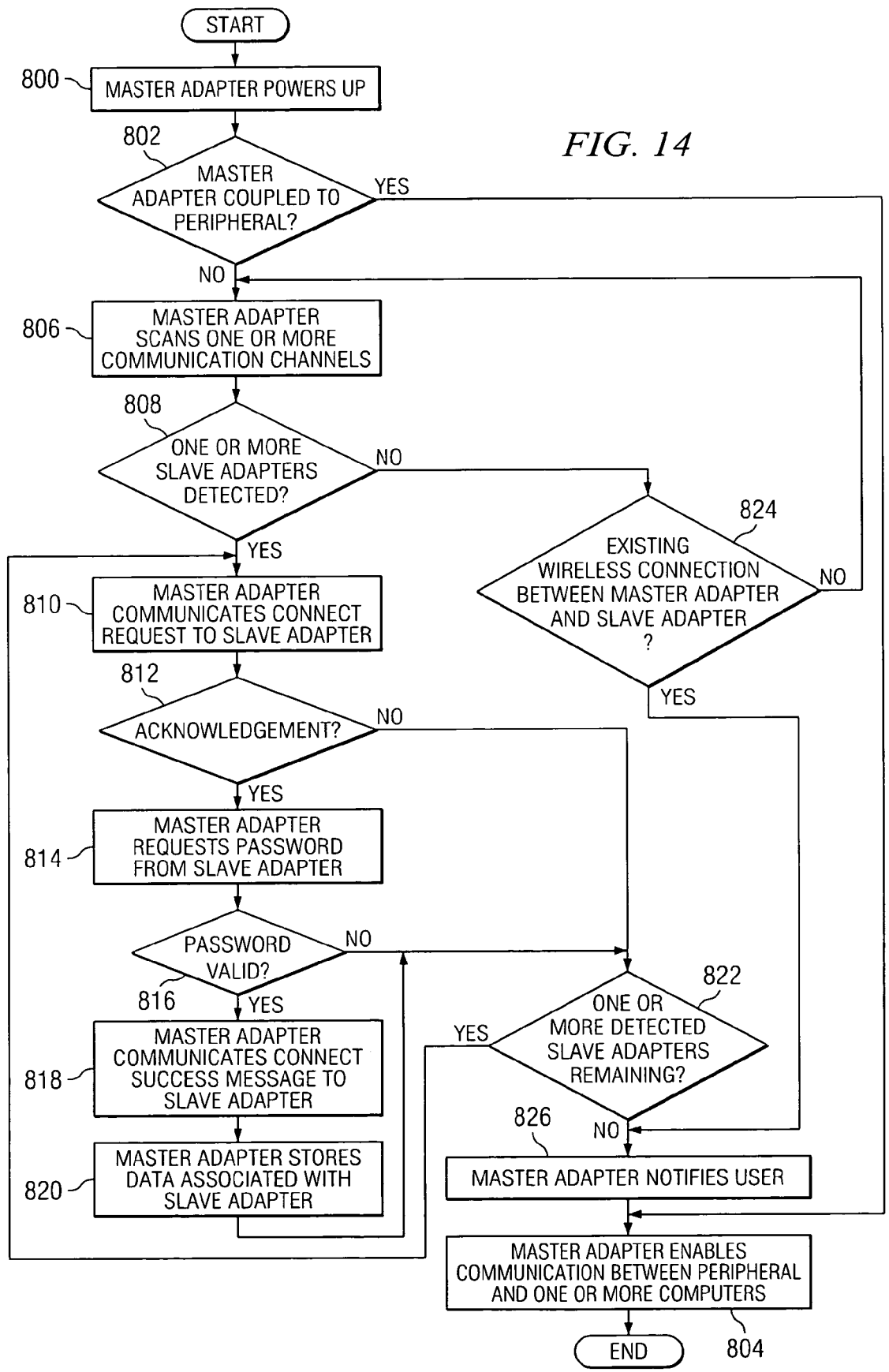
FIG. 14 illustrates an example method for automatically establishing a wireless connection between a master adapter and one or more slave adapters.

FIG. 14 illustrates an example method for automatically establishing a wireless connection 26 between a master adapter 18 and one or more slave adapters 16. The method begins at step 800, where master adapter 18 powers up. At step 802, if master adapter 18 is coupled to peripheral 14, the method proceeds to step 804. At step 804, master adapter 18 enters operational mode and enables communication between peripheral 14 and one or more computers 12, at which point the method ends. At step 802, if master adapter 18 is not coupled to peripheral 14, the method proceeds to step 806. At step 806, master adapter 18 scans one or more communication channels to detect one or more slave adapters 16. In particular embodiments, master adapter 18 scans one or more communication channels to detect slave adapters 16 without wireless connections 26 to master adapter 18. In particular embodiments, master adapter 18 scans the one or more communication channels to detect slave adapters 16 with wireless connections 26 to master adapter 18. In particular embodiments, master adapter 18 scans the one or more communication channels to detect slave adapters 16 with or without wireless connections 26 to master adapter 18.

At step 808, if master adapter 18 detects one or more slave adapters 16, the method proceeds to step 810. At step 810, master adapter 18 communicates a connect request to a slave adapter 16. At step 808, if master adapter 18 does not detect one or more slave adapters 16, the method proceeds to step 824. At step 812, if master adapter 18 receives an acknowledgement from slave adapter 16, the method proceeds to step 814. At step 814, master adapter 18 requests a password from slave adapter 16. At step 812, if master adapter 18 does not receive an acknowledgement from slave adapter 16, the method proceeds to step 822. At step 816, if master adapter 18 receives a valid password from slave adapter 16, the method proceeds to step 818. At step 816, if master adapter 18 does not receive a valid password from slave adapter 16, the method proceeds to step 822.

At step 818, master adapter 18 communicates a connect success message to slave adapter 16. At step 820, master adapter 18 stores data associated with slave adapter 16 in table 30. At step 822, if one or more slave adapters 16 detected at step 806 remain, the method returns to step 810. In particular embodiments, master adapter 18 at least attempts to pair with each slave adapter 16 detected at step 806 before switching from inquiry mode to operational mode. At step 822, if no slave adapters 16 remain, the method proceeds to step 826. At step 826, master adapter 18 notifies a user that master adapter 18 has switched from inquiry mode to operational mode, at which point the method proceeds to step 804. In particular embodiments, as an alternative, master adapter 18 switches from inquiry mode to operational mode without notifying a user. At step 824, if one or more wireless connections 26 between master adapter 18 and one or more slave adapters 16 have already been established, the method proceeds to step 826.

At step 824, if at least one wireless connection 26 between master adapter 18 and at least one slave adapter 16 has not already been established, the method returns to step 806. One or more steps of the method illustrated in FIG. 14 may, in particular embodiments, be just one instance of a loop. As an example, master adapter 18 master switch from operational mode to inquiry mode in response to master adapter 18 being uncoupled from peripheral 14, a user resetting master adapter 18 or otherwise causing master adapter 18 to switch from operational mode to inquiry mode, or the occurrence of any other suitable event. Although particular steps of the method illustrated in FIG. 14 are described and illustrated as occurring in a particular order, the present invention contemplates any suitable steps of the method described above occurring in any suitable order.

Figure 15:
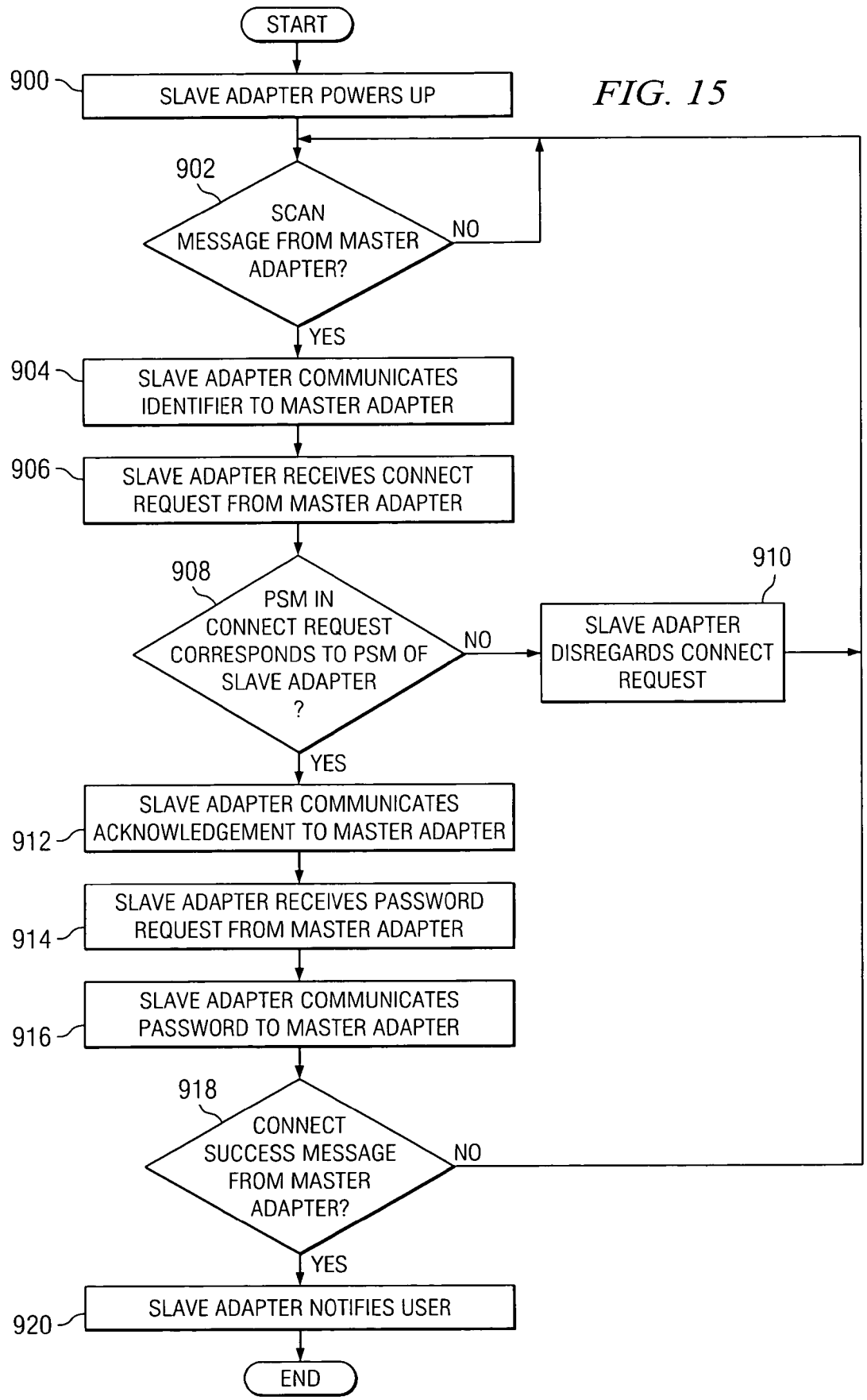
FIG. 15 illustrates an example method for automatically establishing a wireless connection between one or more master adapters and a slave adapter.

FIG. 15 illustrates an example method for automatically establishing a wireless connection between a slave adapter 16 and one or more master adapters 18. The method begins at step 900, where slave adapter 16 powers up. At step 902, if slave adapter 16 receives a scan message from a master adapter 18, the method proceeds to step 904. Otherwise, slave adapter 16 waits until slave adapter 16 receives a scan message from a master adapter 18. At step 904, in response to the scan message, slave adapter 16 communicates an identifier of slave adapter 16 to master adapter 18. At step 906, slave adapter 16 receives a connect request from master adapter 18. At step 908, if a PSM in the connect request does not correspond to a PSM of slave adapter 16, the method proceeds to step 910. At step 910, slave adapter 16 disregards the connect request, and the method returns to step 902.

At step 908, if a PSM in the connect request corresponds to a PSM of slave adapter 16, the method proceeds to step 912. At step 912, slave adapter 16 communicates an acknowledgement to master adapter 18. At step 914, slave adapter 16 receives a password request from master adapter 18. At step 916, in response to the password request, slave adapter 16 communicates a password to master adapter 18. At step 918, if slave adapter 16 receives a connect success message from master adapter, the method proceeds to step 920. At step 920, slave adapter 16 notifies a user that a wireless connection 26 has been established between master adapter 18 and slave adapter 16, at which point the method ends. At step 918, if slave adapter 16 does not receive a connect success message from master adapter, the method returns to step 902.

One or more steps of the method illustrated in FIG. 15 may, in particular embodiments, be just one instance of a loop. As an example, slave adapter 16 may receive multiple scan messages, connect requests, and password requests from multiple master adapters 18, as described above. In particular embodiments, two or more different wireless connections 26 between slave adapter 16 and two or more different master adapters 18 may be established at two or more different times. In particular embodiments, two or more different wireless connections 26 between slave adapter 16 and two or more different master adapters 18 may be established at more or less the same time. Although particular steps of the method illustrated in FIG. 15 are described and illustrated as occurring in a particular order, the present invention contemplates any suitable steps of the method described above occurring in any suitable order.

Although the present invention has been described with several embodiments, myriad changes, variations, alterations, transformations, and modifications may be suggested to one skilled in the art, and it is intended that the present invention encompass such changes, variations, alterations, transformations, and modifications as fall within the scope of the appended claims. The present invention is not intended to be limited, in any way, by any statement in the specification that is not reflected in the claims.

What is claimed is:

1. A system for providing both wireline and wireless connections to a wireline interface, the system comprising:
    a first wireline interface;
    a second wireline interface;
    a wireless interface; and
    a switch coupled to the first and second wireline and wireless interfaces, the switch being operable to selectively:
        couple the first wireline interface to the second wireline interface to allow communication between the first and second wireline interfaces; and
        couple the first wireline interface to the wireless interface to allow communication between the first wireline interface and the wireless interface;
    wherein communication between the first wireline interface and the wireless interface is operable to override communication between the first wireline interface and the second wireline interface, and the override is delayable until a particular communication between the first wireline interface and the second wireline interface has been completed.

2. The system of claim 1, wherein:
    the first wireline interface is adapted to be communicatively coupled to a third wireline interface using a first wireline connection;
    the second wireline interface is adapted to be communicatively coupled to a fourth wireline interface using a second wireline connection;
    the wireless interface comprises a first wireless interface that is operable to communicate with a second wireless interface via a wireless connection;
    the communicative coupling of the first wireline interface to the second wireline interface allows communication between the third and fourth wireline interfaces via the first and second wireline connections; and
    the communicative coupling of the first wireline interface to the first wireline interface allows communication between the second wireless interface and the third wireline interface via the wireless and first wireline connections.

3. The system of claim 2, wherein:
    a peripheral device is associated with the third wireline interface;
    a first computer system is associated with the fourth wireline interface;
    a second computer system is associated with the second wireless interface;
    the communicative coupling of the first wireline interface to the second wireline interface allows communication between the peripheral device and the first computer system via the first and second wireline connections; and
    the communicative coupling of the first wireless interface to the first wireline interface allows communication between the peripheral device and the second computer system via the wireless and first wireline connections.

4. The system of claim 3, wherein:
    the first wireline interface is a universal serial bus (USB) type A socket;
    the second wireline interface is a USB type B socket;
    the third wireline interface is a USB port of the peripheral device;
    the fourth wireline interface is a USB port of the first computer system;
    the first wireless interface is a master adapter; and
    the second wireless interface is a slave adapter coupled to the second computer system using a USB socket.

5. The system of claim 3, wherein the wireless connection is automatically established when the second wireless interface is coupled to the second computer system.

6. The system of claim 3, wherein the peripheral device is a printer, a scanner, digital camera, modem, joystick, webcam, personal digital assistant (PDA), mouse, keyboard, port replicator, fax device, or all-in-one printer device.

7. The system of claim 2, wherein:
the wireless connection comprises a first wireless connection;
the system further comprises a third wireless interface;
the first wireless interface is further operable to communicate with the third wireless interface via a second wireless connection; and
the coupling of the first wireless interface to the first wireline interface further allows communication between the third wireless interface and the third wireline interface wherein communications between the first wireline interface and the second wireless interface and between the first wireline interface and the third wireless interface are scheduled according to a predetermined schedule.

8. The system of claim 7, wherein the predetermined schedule comprises a prioritization among a plurality of wireless interfaces.

9. The system of claim 2, wherein the wireless connection is automatically established when the first wireless interface is reset.

10. The system of claim 2, wherein the first and second wireline connections each comprise one or more of:
one or more insulated wires;
one or more shielded twisted-pair wires;
one or more coaxial cables;
one or more optical fibers; and
one or more serial buses.

11. The system of claim 2, wherein the first wireless interface is operable to communicate with the second wireless interface using a BLUETOOTH wireless protocol.

12. A method for providing both wireline and wireless connections to a wireline interface, the method comprising selectively:
coupling a first wireline interface to a second wireline interface to allow communication between the first and second wireline interfaces; and
coupling the first wireline interface to a wireless interface to allow communication between the first wireline interface and the wireless interface;
wherein communication between the first wireline interface and the wireless interface is operable to override communication between the first wireline interface and the second wireline interface, and the override is delayable until a particular communication between the first wireline interface and the second wireline interface has been completed.

13. The method of claim 12, wherein:
the first wireline interface is adapted to be communicatively coupled to a third wireline interface using a first wireline connection;
the second wireline interface is adapted to be communicatively coupled to a fourth wireline interface using a second wireline connection;
the wireless interface comprises a first wireless interface that is operable to communicate with a second wireless interface via a wireless connection;
communicatively coupling the first wireline interface to the second wireline interface allows communication between the third and fourth wireline interfaces via the first and second wireline connections; and
communicatively coupling the first wireless interface to the first wireline interface allows communication between the second wireless interface and the third wireline interface via the wireless and first wireline connections.

14. The method of claim 13, wherein:
a peripheral device is associated with the third wireline interface;
a first computer system is associated with the fourth wireline interface;
a second computer system is associated with the second wireless interface;
communicatively coupling the first wireline interface to the second wireline interface allows communication between the peripheral device and the first computer system via the first and second wireline connections; and
communicatively coupling the first wireless interface to the first wireline interface allows communication between the peripheral device and the second computer system via the wireless and first wireline connections.

15. The method of claim 14, wherein:
the first wireline interface is a universal serial bus (USB) type A socket;
the second wireline interface is a USB type B socket;
the third wireline interface is a USB port of the peripheral device;
the fourth wireline interface is a USB port of the first computer system;
the first wireless interface is a master adapter; and
the second wireless interface is a slave adapter coupled to the second computer system using a USB socket.

16. The method of claim 14, wherein the wireless connection is automatically established when the second wireless interface is coupled to the second computer system.

17. The method of claim 14, wherein the peripheral device is a printer, a scanner, digital camera, modem, joystick, webcam, personal digital assistant (PDA), mouse, keyboard, port replicator, fax device, or all-in-one printer device.

18. The method of claim 13, wherein:
the wireless connection comprises a first wireless connection;
the system further comprises a third wireless interface;
the first wireless interface is further operable to communicate with the third wireless interface via a second wireless connection; and
coupling the first wireless interface to the first wireline interface further allows communication between the third wireless interface and the third wireline interface wherein communications between the first wireline interface and the second wireless interface and between the first wireline interface and the third wireless interface are scheduled according to a predetermined schedule.

19. The method of claim 18, wherein the predetermined schedule comprises a prioritization among a plurality of wireless interfaces.

20. The method of claim 13, wherein the wireless connection is automatically established when the first wireless interface is reset.

21. The method of claim 13, wherein the first and second wireline connections each comprise one or more of:
one or more insulated wires;
one or more shielded twisted-pair wires;
one or more coaxial cables;
one or more optical fibers; and
one or more serial buses.

22. The method of claim 13, wherein the first wireless interface is operable to communicate with the second wireless interface using a BLUETOOTH wireless protocol.

23. Logic for providing both wireline and wireless connections to a wireline interface, the logic encoded in recordable media and when executed, selectively performing steps comprising:
   causing a switch to communicatively couple a first wireline interface to a second wireline interface to allow communication between the first and second wireline interfaces; and
   causing a switch to communicatively couple the first wireline interface to a wireless interface to allow communication between the first wireline interface and the wireless interface;
   wherein communication between the first wireline interface and the wireless interface is operable to override communication between the first wireline interface and the second wireline interface, and the override is delayable until a particular communication between the first wireline interface and the second wireline interface has been completed.

24. The logic of claim 23, wherein:
   the first wireline interface is adapted to be communicatively coupled to a third wireline interface using a first wireline connection;
   the second wireline interface is adapted to be communicatively coupled to a fourth wireline interface using a second wireline connection;
   the wireless interface comprises a first wireless interface that is operable to communicate with a second wireless interface via a wireless connection;
   communicatively coupling the first wireline interface to the second wireline interface allows communication between the third and fourth wireline interfaces via the first and second wireline connections; and
   communicatively coupling the first wireless interface to the first wireline interface allows communication between the second wireless interface and the third wireline interface via the wireless and first wireline connections.

25. The logic of claim 24, wherein:
   a peripheral device is associated with the third wireline interface;
   a first computer system is associated with the fourth wireline interface;
   a second computer system is associated with the second wireless interface;
   communicatively coupling the first wireline interface to the second wireline interface allows communication between the peripheral device and the first computer system via the first and second wireline connections; and
   communicatively coupling the first wireless interface to the first wireline interface allows communication between the peripheral device and the second computer system via the wireless and first wireline connections.

26. The logic of claim 25, wherein:
   the first wireline interface is a universal serial bus (USB) type A socket;
   the second wireline interface is a USB type B socket;
   the third wireline interface is a USB port of the peripheral device;
   the fourth wireline interface is a USB port of the first computer system;
   the first wireless interface is a master adapter; and
   the second wireless interface is a slave adapter coupled to the second computer system using a USB socket.

27. The logic of claim 25, wherein the wireless connection is automatically established when the second wireless interface is coupled to the second computer system.

28. The logic of claim 25, wherein the peripheral device is a printer, a scanner, digital camera, modem, joystick, webcam, personal digital assistant (PDA), mouse, keyboard, port replicator, fax device, or all-in-one printer device.

29. The logic of claim 24, wherein:
   the wireless connection comprises a first wireless connection;
   the system further comprises a third wireless interface;
   the first wireless interface is further operable to communicate with the third wireless interface via a second wireless connection; and
   coupling the first wireless interface to the first wireline interface further allows communication between the third wireless interface and the third wireline interface wherein communications between the first wireline interface and the second wireless interface and between the first wireline interface and the third wireless interface are scheduled according to a predetermined schedule.

30. The logic of claim 29, wherein the predetermined schedule comprises a prioritization among a plurality of wireless interfaces.

31. The logic of claim 24, wherein the wireless connection is automatically established when the first wireless interface is reset.

32. The logic of claim 24, wherein the first and second wireline connections each comprise one or more of:
   one or more insulated wires;
   one or more shielded twisted-pair wires;
   one or more coaxial cables;
   one or more optical fibers; and
   one or more serial buses.

33. The logic of claim 24, wherein the first wireless interface is operable to communicate with the second wireless interface using a BLUETOOTH wireless protocol.

* * * * *